United States Patent
Milligan et al.

(10) Patent No.: US 7,400,510 B1
(45) Date of Patent: Jul. 15, 2008

(54) CANISTER-BASED STORAGE SYSTEM

(75) Inventors: Charles A. Milligan, Golden, CO (US); Michael L. Leonhardt, Longmont, CO (US); Stephen S. Selkirk, Westminster, CO (US); Thai Nguyen, Thornton, CO (US); Steven H. McCown, Rigby, ID (US); Michael V. Konshak, Louisville, CO (US); Robert Klunker, Aureville (FR); Gerald O. Nions, Toulouse (FR); Jacques Debiez, Cugnaux (FR); Ludovic Duval, Portet sur Garonne (FR); Philippe Y. Le. Graverand, Saint Lys. (FR)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 11/022,613

(22) Filed: Dec. 27, 2004
(Under 37 CFR 1.47)

Related U.S. Application Data

(63) Continuation of application No. 10/791,205, filed on Mar. 2, 2004, now Pat. No. 7,304,855.

(60) Provisional application No. 60/451,460, filed on Mar. 3, 2003.

(51) Int. Cl.
*H05K 5/00* (2006.01)

(52) U.S. Cl. .................. 361/752; 361/800; 361/797; 361/788

(58) Field of Classification Search .................. 361/752, 361/790, 797, 800, 715, 756, 788
See application file for complete search history.

(56) References Cited

U.S. PATENT DOCUMENTS

| | | | |
|---|---|---|---|
| 4,504,936 A | | 3/1985 | Faber et al. |
| 4,674,004 A | | 6/1987 | Smith et al. |
| 4,754,397 A | | 6/1988 | Varaiya et al. |
| 5,063,476 A | | 11/1991 | Hamadah et al. |
| 5,077,722 A | * | 12/1991 | Geist et al. .................. 720/657 |
| 5,206,845 A | | 4/1993 | Baxter et al. |
| 5,237,484 A | | 8/1993 | Ferchau et al. |
| 5,274,530 A | | 12/1993 | Anderson |
| 5,412,661 A | | 5/1995 | Hao et al. |
| 5,446,855 A | | 8/1995 | Dang et al. |
| 5,506,750 A | | 4/1996 | Carteau et al. |
| 5,515,515 A | | 5/1996 | Kennedy et al. |
| 5,566,316 A | | 10/1996 | Fechner et al. |
| 5,604,662 A | | 2/1997 | Anderson et al. |

(Continued)

OTHER PUBLICATIONS

Infinisan ATAboy, Nexsan Technologies, On-Guard Technical Services, www.nexsan.com, ATA disk based RAID.

(Continued)

*Primary Examiner*—Tuan T. Dinh
*Assistant Examiner*—Hung S Bui
(74) *Attorney, Agent, or Firm*—Brooks Kushman P.C.

(57) ABSTRACT

The present invention provides a flexible storage system through the use of portable, removable canisters holding multiple storage subsystems.

9 Claims, 27 Drawing Sheets

U.S. PATENT DOCUMENTS

| | | | |
|---|---|---|---|
| 5,615,352 | A | 3/1997 | Jacobson et al. |
| 5,634,810 | A | 6/1997 | Niitsu et al. |
| 5,680,294 | A | 10/1997 | Stora et al. |
| 5,737,189 | A | 4/1998 | Kammersgard et al. |
| 5,751,549 | A | 5/1998 | Eberhardt et al. |
| 5,757,617 | A | 5/1998 | Sherry |
| 5,822,184 | A | 10/1998 | Rabinovitz |
| 5,832,198 | A | 11/1998 | Lucht |
| 5,914,858 | A | 6/1999 | McKeen et al. |
| 5,941,994 | A | 8/1999 | DeKoning et al. |
| 6,052,278 | A | 4/2000 | Tanzer et al. |
| 6,098,114 | A | 8/2000 | McDonald et al. |
| 6,138,176 | A | 10/2000 | McDonald et al. |
| 6,145,028 | A | 11/2000 | Shank et al. |
| 6,166,900 | A | 12/2000 | Flynn et al. |
| 6,222,699 | B1 | 4/2001 | Luffel et al. |
| 6,272,573 | B1 | 8/2001 | Coale et al. |
| 6,288,902 | B1 | 9/2001 | Kim et al. |
| 6,301,625 | B1 | 10/2001 | McDonald et al. |
| 6,317,334 | B1 | 11/2001 | Abruzzini et al. |
| 6,356,441 | B1 | 3/2002 | Claprood |
| 6,381,139 | B1 | 4/2002 | Sun |
| 6,473,297 | B1 | 10/2002 | Behl et al. |
| 6,480,391 | B1 * | 11/2002 | Monson et al. ............ 361/752 |
| 6,501,660 | B1 * | 12/2002 | Ho et al. ..................... 361/752 |
| 6,560,098 | B1 | 5/2003 | Beinor, Jr. et al. |
| 6,775,720 | B1 | 8/2004 | Glynn |
| 2001/0021099 | A1 | 9/2001 | Shedow et al. |
| 2004/0010660 | A1 | 1/2004 | Konshak et al. |

OTHER PUBLICATIONS

Infinisan ATAboy2, Nexsan Technologies, On-Guard Technical Services, www.nexsan.com ATA disk based RAID.

InfinisanD2D, There is a better way to protect my date than tape, Nexsan Technologies, www.nexsan.com.

The Value of Storage Virtualization, a white paper, Falconstar Software, 2001 Falconstor Software, Inc, www.falconstor.com.

Virtualization High Availability Mirroring Back Up Storage Devices, IPStor, FalconStor Software, The Art of Storage Networking, www.FalconStor.com.

Sansymphony, Version 5 Datasheet, Storage Management, Virtualization and Control, DataCore Software www.datacore.com.

New Tape Library Alternative from Alacritus Software, Alacritus Software, Protects Corporate Data Assets, Ensures High Quality Performance & Reduces Storage Management Costs.

Double-Take, Features and Benefits, Advantages of Double Take, The Protection of Real-Time Data Replication in a Multi-Platform Software Solution, Continuous Data Availability, NSI Software.

Infinisan ATAboy, Nexsan Technologies, On-Guard Technical Services, www.nexsan.com, ATA disk based RAID, no date.

Infinisan ATAboy2, Nexsan Technologies, On-Guard Technical Services, www.nexsan.com ATA disk based RAID, no date.

InfinisanD2D, There is a better way to protect my date than tape, Nexsan Technologies, www.nexsan.com, no date.

Virtualization High Availability Mirroring Back Up Storage Devices, IPStor, FalconStor Software, The Art of Storage Networking, www.FalconStor.com, no date.

Sansymphony, Version 5 Datasheet, Storage Management, Virtualization and Control, DataCore Software www.datacore.com, no date.

Double-Take, Features and Benefits, Advantages of Double Take, The Protection of Real-Time Data Replication in a Multi-Platform Software Solution, Continuous Data Availability, NSI Software, no date.

* cited by examiner

CANISTER-BASED STORAGE SYSTEM

CROSS-REFERENCE TO RELATED APPLICATIONS

This application claims the benefit of U.S. provisional application Ser. No. 60/451,460 filed Mar. 3, 2003, which is hereby incorporated by reference in its entirety. This application is a continuation of U.S. application Ser. No. 10/791,205 filed Mar. 2, 2004, which is hereby incorporated by reference in its entirety.

BACKGROUND OF THE INVENTION

1. Field of the Invention

The present invention relates to storage systems capable of holding large quantities of information.

2. Background Art

Data storage systems provide long term, low cost storage for data. Many of these systems utilize hard disks for short term storage and removable tapes for long term storage. "Hard disks" refer to disks, magnetic, optical or otherwise, that combine data storage media with an access head and at least some support electronics. For simplicity, these will be referred to as simply "disks." These disks offer shorter latency and higher throughput rates than tapes or removable disks. However, these disks have traditionally been higher in cost per bit.

Recent advances in disk technology has decreased the cost per bit of hard disks. What is needed is a long term storage system that takes advantage of these improvements to create greater efficiencies in storage systems.

SUMMARY OF THE INVENTION

The present invention provides a flexible storage system through the use of portable, removable canisters holding multiple storage subsystems.

DETAILED DESCRIPTION OF THE PREFERRED EMBODIMENT(S)

Figure 1:
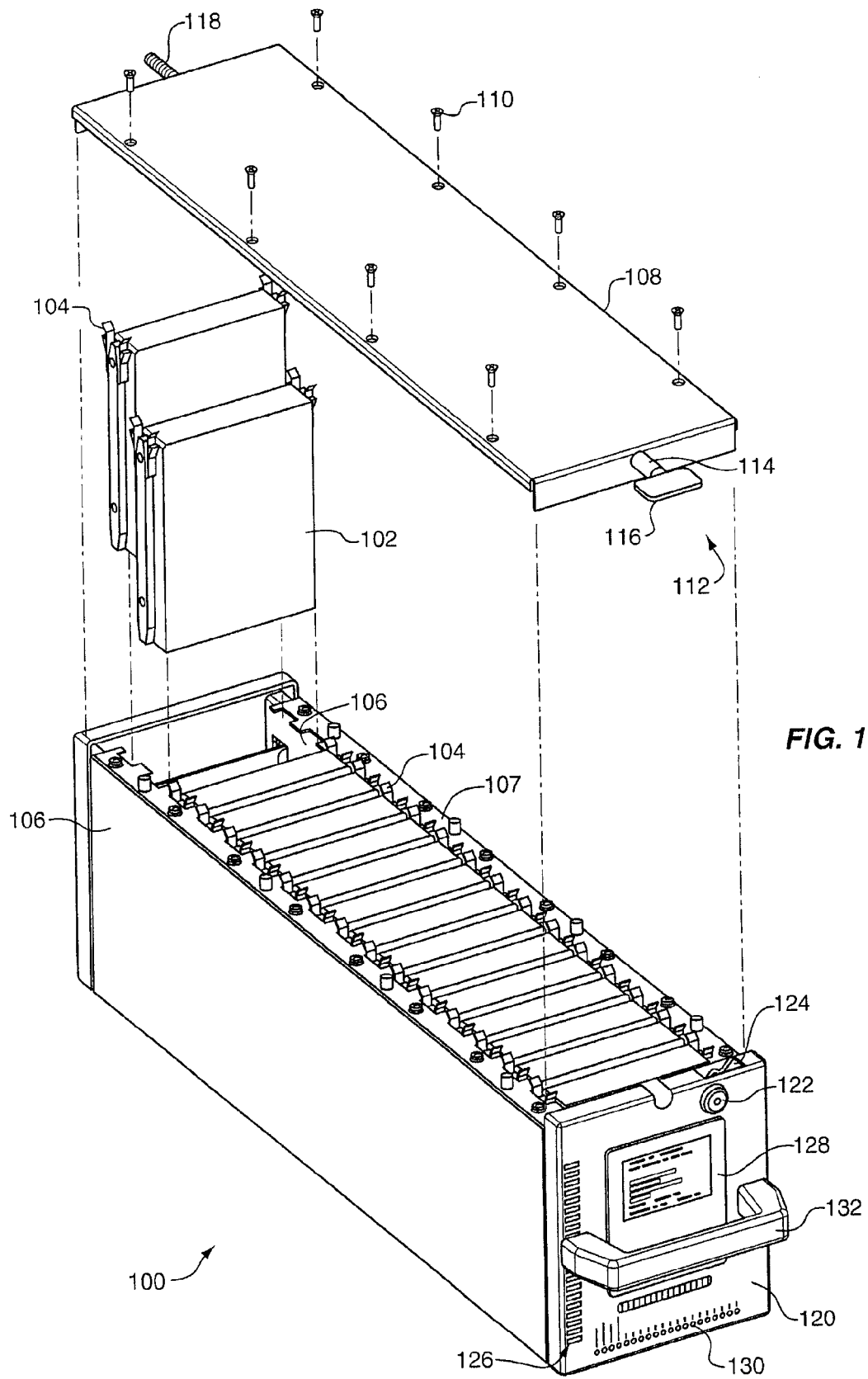
FIG. 1 is an exploded view of a storage module according to an embodiment of the present invention.

Referring to FIG. 1, an exploded view of a storage module according to an embodiment of the present invention is shown. A storage module or canister, shown generally by 100, holds a plurality of sub-modules, one of which is indicated by 102. In this embodiment, sub-modules 102 are vertically oriented in common alignment. Retention clips 104 on sub-modules 102 engage integrated mounting/cooling air manifolds 106 and housing 107. Manifolds 106 include metering orifices positioned on either side of sub-modules 102. Module 100 includes cover 108 which attaches to manifolds 106 using screws 110. As will be more fully disclosed below, sub-modules 102 typically include disks or other storage devices and may include one or more of controller electronics, virtualization electronics, module identification electronics, cooling systems, environmental mediation systems, power supply functions, interface and networking functions, and the like.

Cover 108 includes a portion of a retention system, shown generally by 112. Shaft 114 is affixed in cover 108 to rotate but not translate. Paddle 116 is affixed to the front portion of shaft 114. The back portion of shaft 114 includes threaded portion 118. Retention system 112 is accessed from the front of module and provides a first mechanical stop at the rear of module 100 when module 100 is inserted into a secondary packaging such as a dock, rack or the like. Thus, retention system 112 avoids damage to rear electrical connectors. Retention system 112 also provides mechanical advantage by threading threaded portion 118 into the secondary package, seating module 100 into the secondary package. Retention system 112 may be accessed by manually turning paddle 116 or through the use of automated equipment rotating paddle 116.

Module 100 includes front face 120. Front face 120 includes module lock 122. Rotating lock 122 moves tab 124, providing retention and/or lock functionality. Lock functionality may be used to affix module 100 within operational packages, transport packages, storage packages, and the like. Module front face 120 also includes vent openings, shown generally by 126, which permit cooling air to escape from module 100. Vent openings 126 seal when module 100 is not in use. Front face 120 also includes user interface 128 which may include a graphical display, identification label, keypad, and the like. Status indicators 130 provide and indication of the operational status and error conditions of module 100. Handle 132 attached to front face 120 permits transport of module 100. Front face 120 may also support identifying markings readable by an operator or by automated equipment.

Module 100 can be labeled independent of each sub-module 102 housed within the canister. The label can be in a multiplicity of synchronized forms, with some formats presenting a subset of the metadata found in other formats. An example would be a physical paper label with volume information being a subset of a radio frequency label having that information plus additional environmental information, which in turn is a subset of the contents information, such as a virtual table of content that is contained in internal solid state memory.

Information such as serial number, manufacturer information, and the like, is part of the information contained at some level of the labeling hierarchy. This information is checked on power up and on insertion of module 100 into any inventory capable system. The label information is a primary means of maintaining data in a physical warehouse of a large number of modules 100.

In an embodiment of the present invention, module 100 will include sixteen 3.5" disk drives as sub-modules 102. Such a module 100 would be approximately ⅓ rack wide, 4 U high, and 21 in. (53 cm.) long. Disk drives fitting the 2½" standard may also be used. In addition, sub-modules may have different form factors. Module 100 may be sealed to prevent user access.

Figure 2:
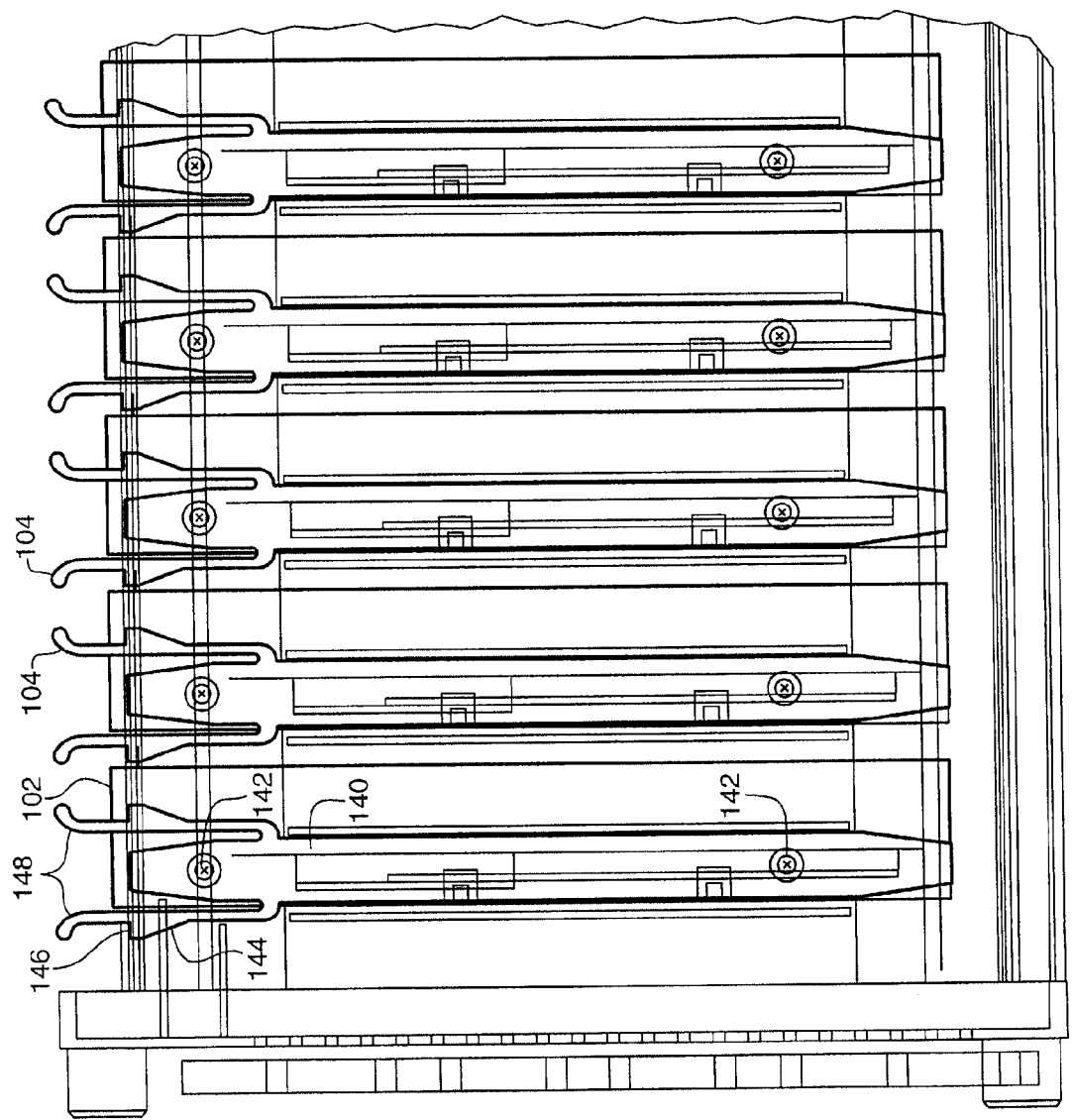
FIG. 2 is an internal view of sub-module retention clips according to an embodiment of the present invention.

Referring now to FIG. 2, an internal view of sub-module retention clips according to an embodiment of the present invention is shown. Each pair of retention clips 104 is mounted on retention shaft 140. Retention shaft 140 is held to sub-module 102 by screws 142. Each pair of retention clips 104 is attached to one sub-module 102. Retention clips 104 include slanted portion 144 which contacts housing 107, deflecting retention clip 104 as sub-module 102 is inserted into module 100. When sub-module 102 is properly inserted, flat portion 146 of retention clip 104 prevents sub-module 102 from rising out of module 100. Squeezing together release handles 148 on each of a pair of retention clips 104 permits sub-module 102 to be easily removed from module 100.

Figure 3:
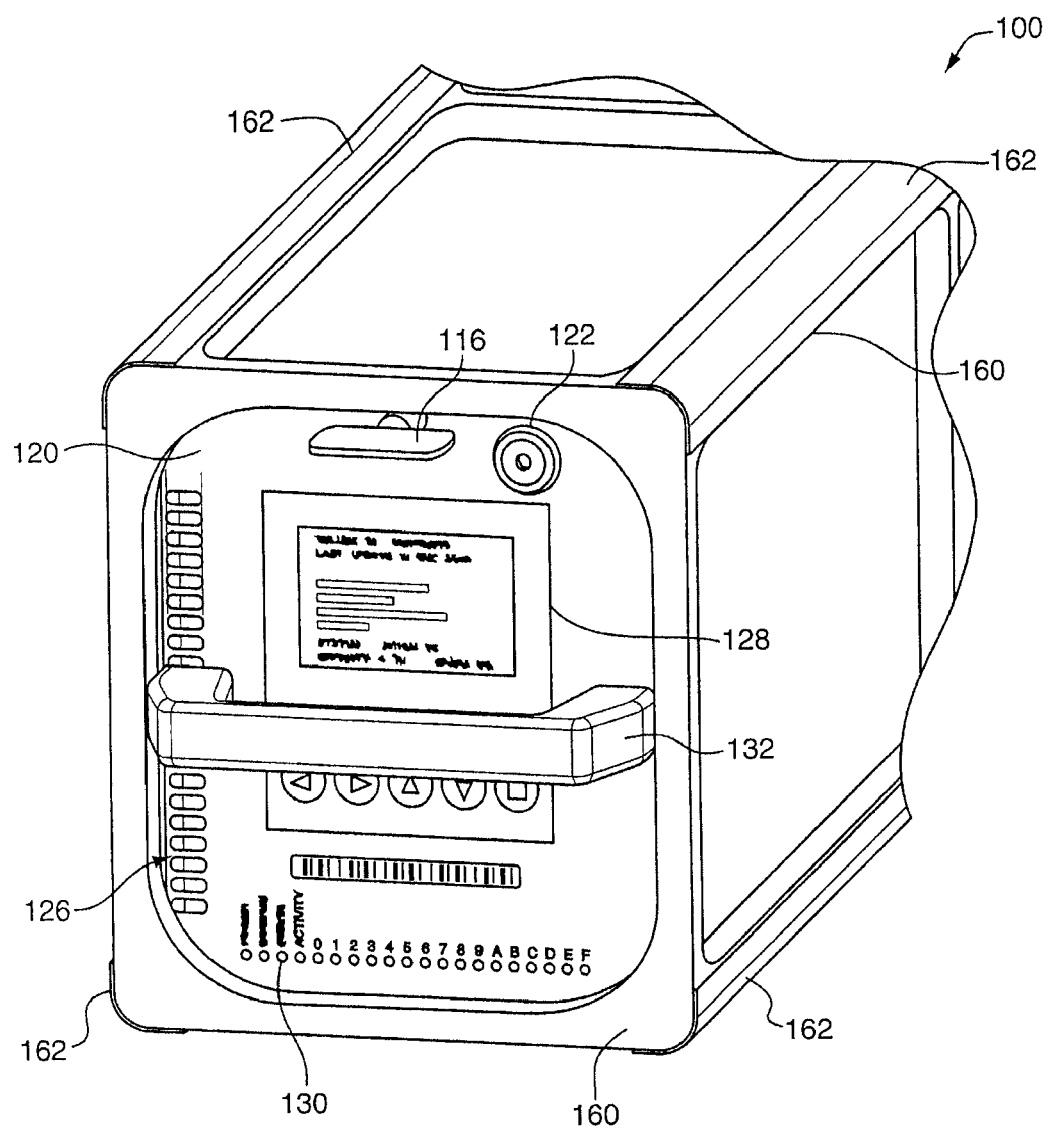
FIG. 3 is a detailed view of a module front face according to an embodiment of the present invention.

Referring now to FIG. 3, a detailed view of a module front face according to an embodiment of the present invention is shown. Module 100 is shown covered by shock absorbing frame 160. Frame 160 is made of a compliant and resilient shock absorbing material such as moldable thermoplastics or thermoset polymers including, without limitation, polyolefins such as polyethylene or polypropylene, polystyrene, and the like, including elastomeric materials such as SBR, elastomeric epoxy resins, and the like. The frame may also be comprised of a rubbery elastomer, or have portions of elastomer bonded thereto. Frame 160 includes abrasion resistant strips 162 comprised of, for example, metal strips, thermoplastics filled with large particle size fillers such as crushed stone, sand or the like, or may be a thermoplastic with a higher abrasion resistance such as nylon or the like. Strips 162 may be molded into frame 160, adhered to frame 160, fastened to frame 160, or the like.

Figure 4:
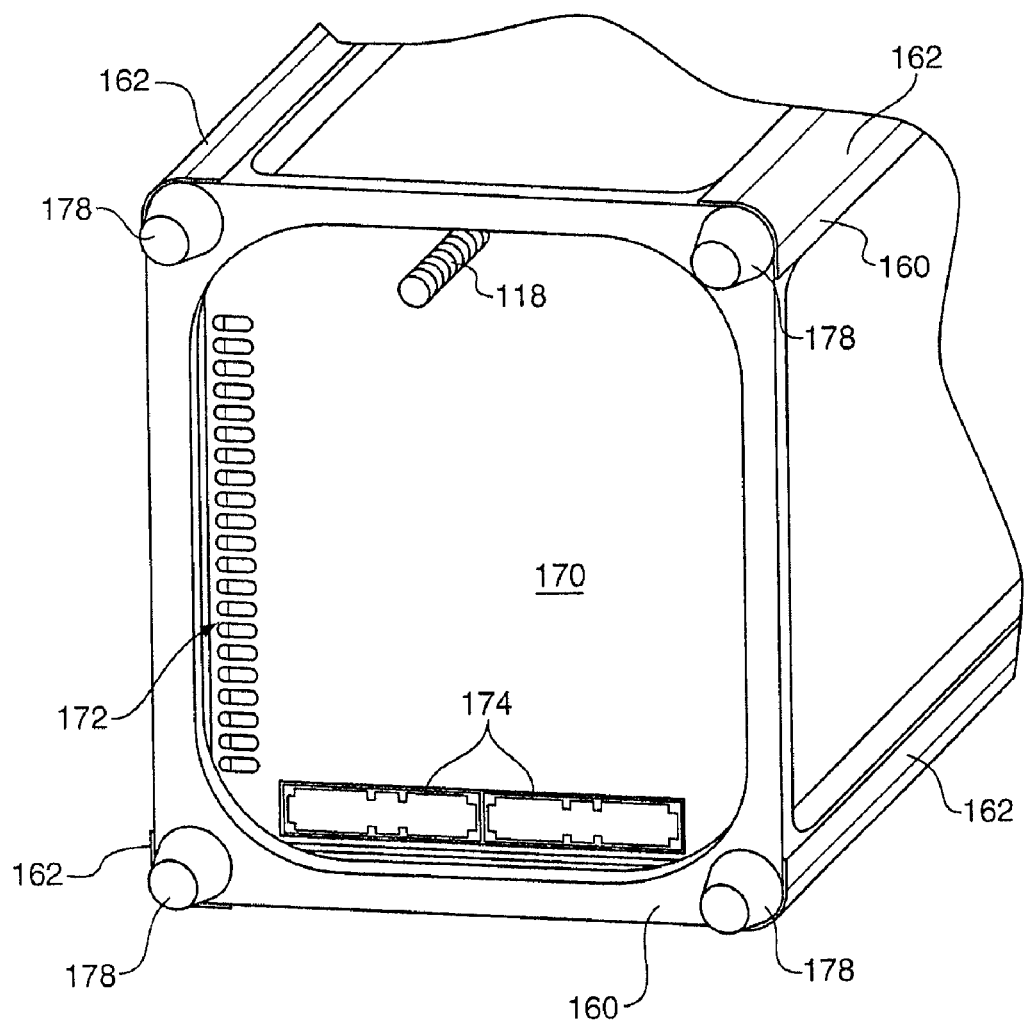
FIG. 4 is a detailed view of a module rear face according to an embodiment of the present invention.

Referring now to FIG. 4, a detailed view of a module rear face according to an embodiment of the present invention is shown. Rear face 170 of module 100 includes rear vent openings, shown generally by 172. Cooling air enters module 100 through rear vent openings 172 while module 100 is in use. Rear vent openings 172 are closed when module 100 is not in use. Rear face 170 includes connectors 174 which mate with connectors in secondary packaging to provide module 100 with power. Connectors 174 also provide signal paths into and out of module 100 for data, control and status information. Bumpers 178 attached to frame 160 assist in seating module 100 within secondary packaging.

Figure 5:
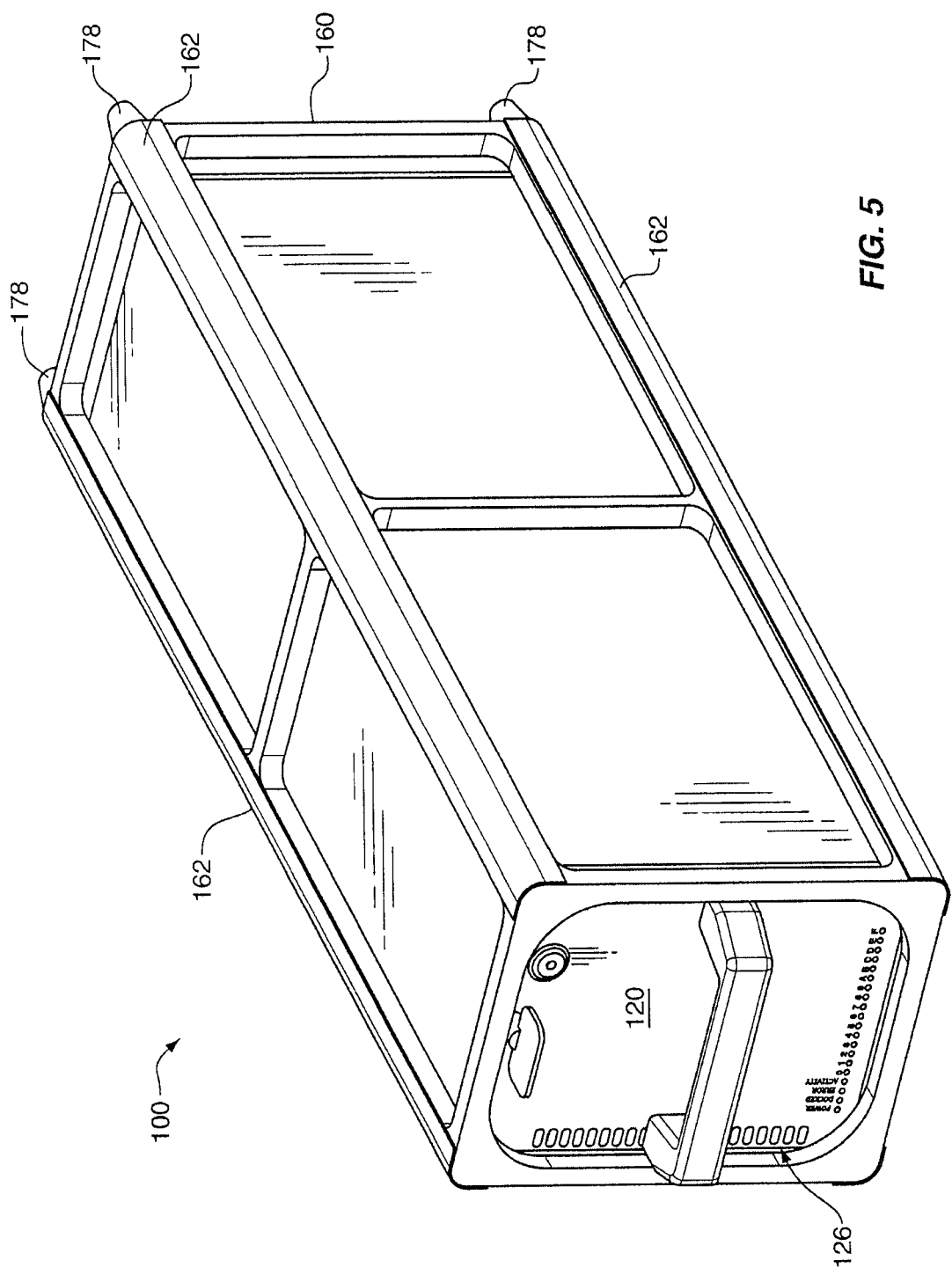
FIG. 5 is an assembled module according to an embodiment of the present invention.

Referring now to FIG. 5, an assembled module according to an embodiment of the present invention is shown. Module 100 is shown inserted into shock absorbing frame 160. Module 100 is inserted into frame 160 by sliding module 100 into the back of frame 160. Frame 160 is preferably included with module 100 when module 100 is to be transported by an operator.

Figure 6:
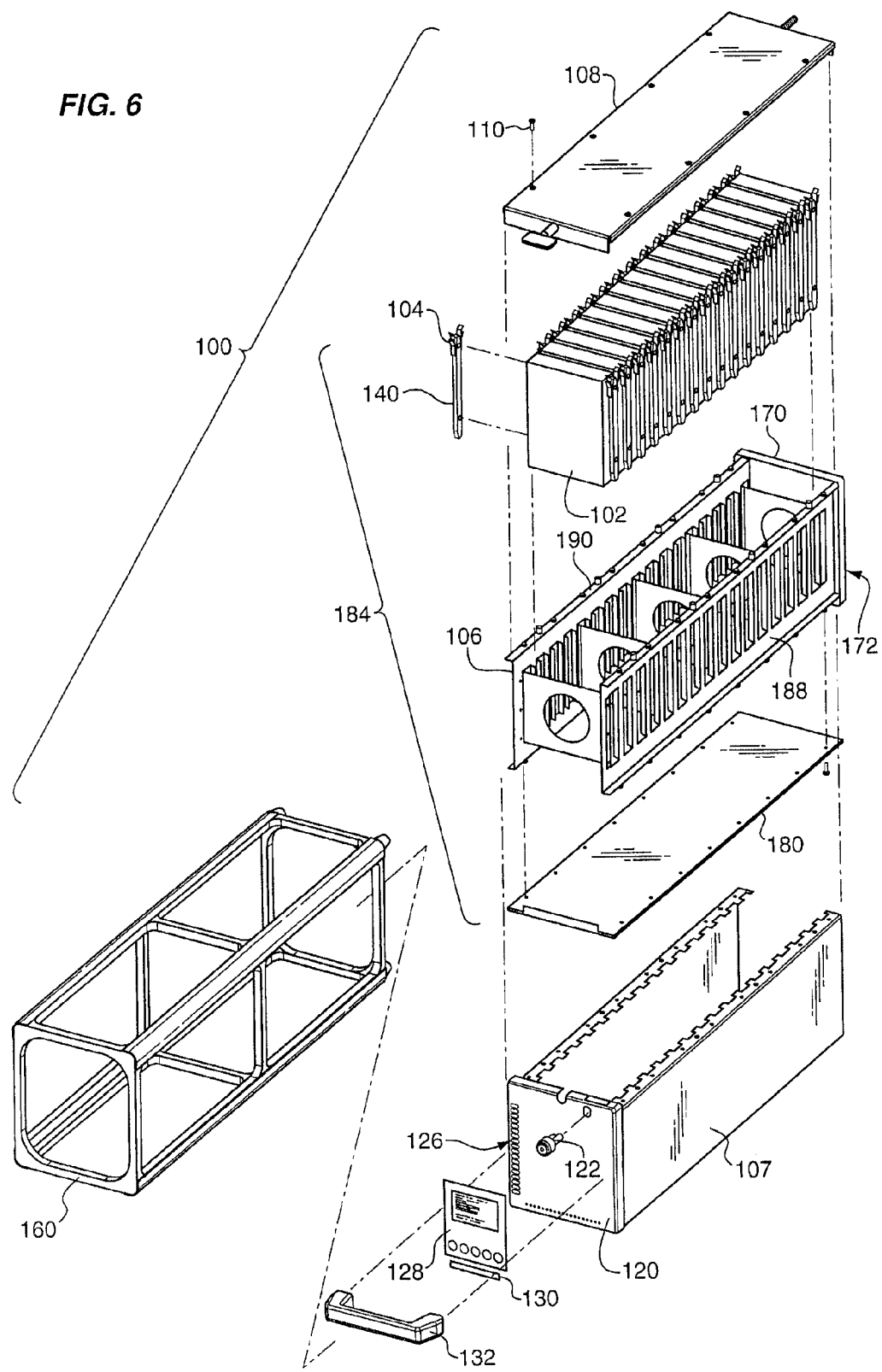
FIG. 6 is an exploded view of a module according to an embodiment of the present invention.

Referring now to FIG. 6, an exploded view of a module according to an embodiment of the present invention is shown. Mounting/cooling air manifolds 106 attach to printed wiring board 180 using bolts, one of which is shown by 182. Sub-modules 102 slide into manifolds 106 as described above. In one embodiment, connectors on sub-modules 102 fit into mating connectors, not shown, on printed wiring board 180. The type and placement of these connectors depends on the type of sub-module 102. Printed wiring board 180 also interconnects connectors 174 on back face 170, indicators 130 and user interface 128.

The manifold sub-module assembly, including manifolds 106, sub-modules 102 and printed wiring board 180, slides into the back of housing 107. Attaching screws, one of which is indicated by 110, pass through cover 108, manifolds 106 and into housing 107. Handle 132, module lock 122, indicators 130 and user interface 128 attach to front face 120 of housing 107. Protective frame 160 slides over housing 107 and cover 108.

During operation, cooling air enters module 100 through rear vent openings 172 on rear face 170. Air flows along right manifold 188, entering slots in right manifold 188. The air passes between sub-modules 102 before passing through left manifold 190. The air travels forward along left manifold 190, exiting through front vent openings 126 in front face 120. Slots in right manifold 188 and left manifold 190 may be partially or completely blocked with plastic inserts based on the cooling needs of sub-modules 102 near these slots.

Figure 7:
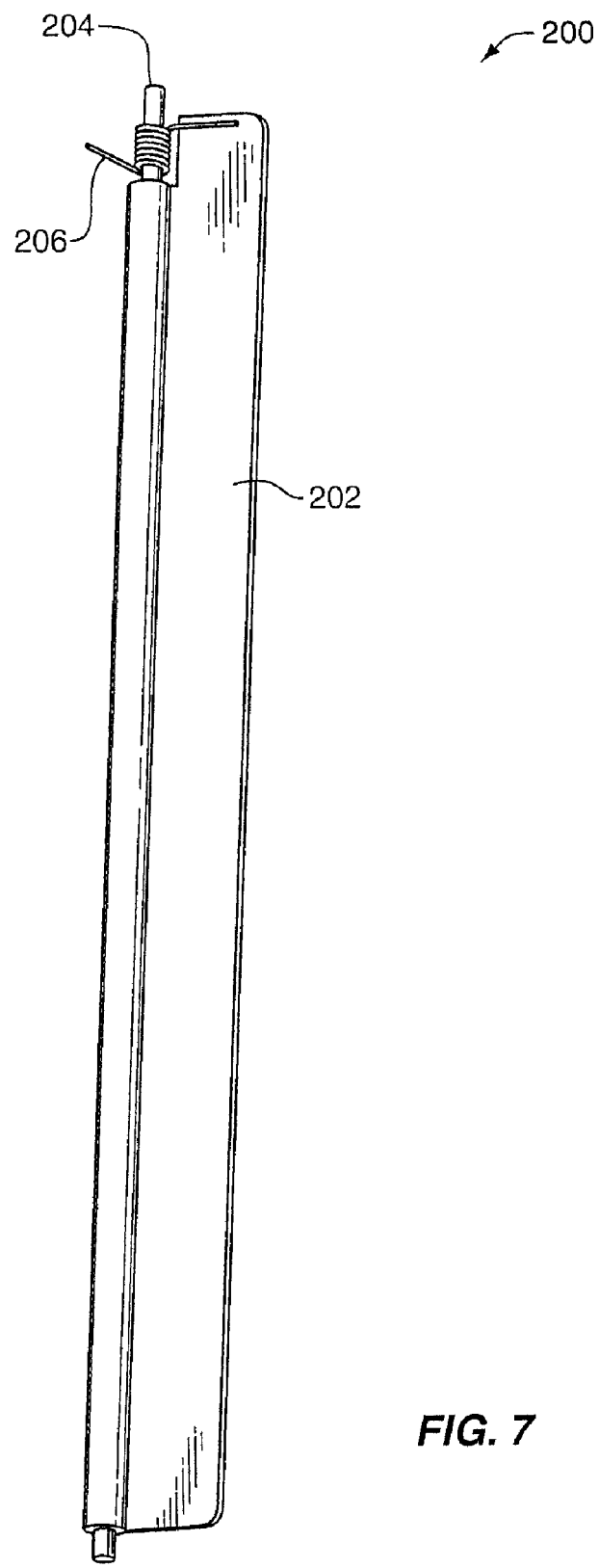
FIG. 7 is an illustration of a flap assembly for sealing vent openings according to an embodiment of the present invention.

Referring now to FIG. 7, a flap assembly for sealing vent openings according to an embodiment of the present invention is shown. A flap assembly, shown generally by 200, includes flap 202 operative to rotate about pin 204. When installed, spring 206 biases flap 202 in a closed position.

Figure 8:
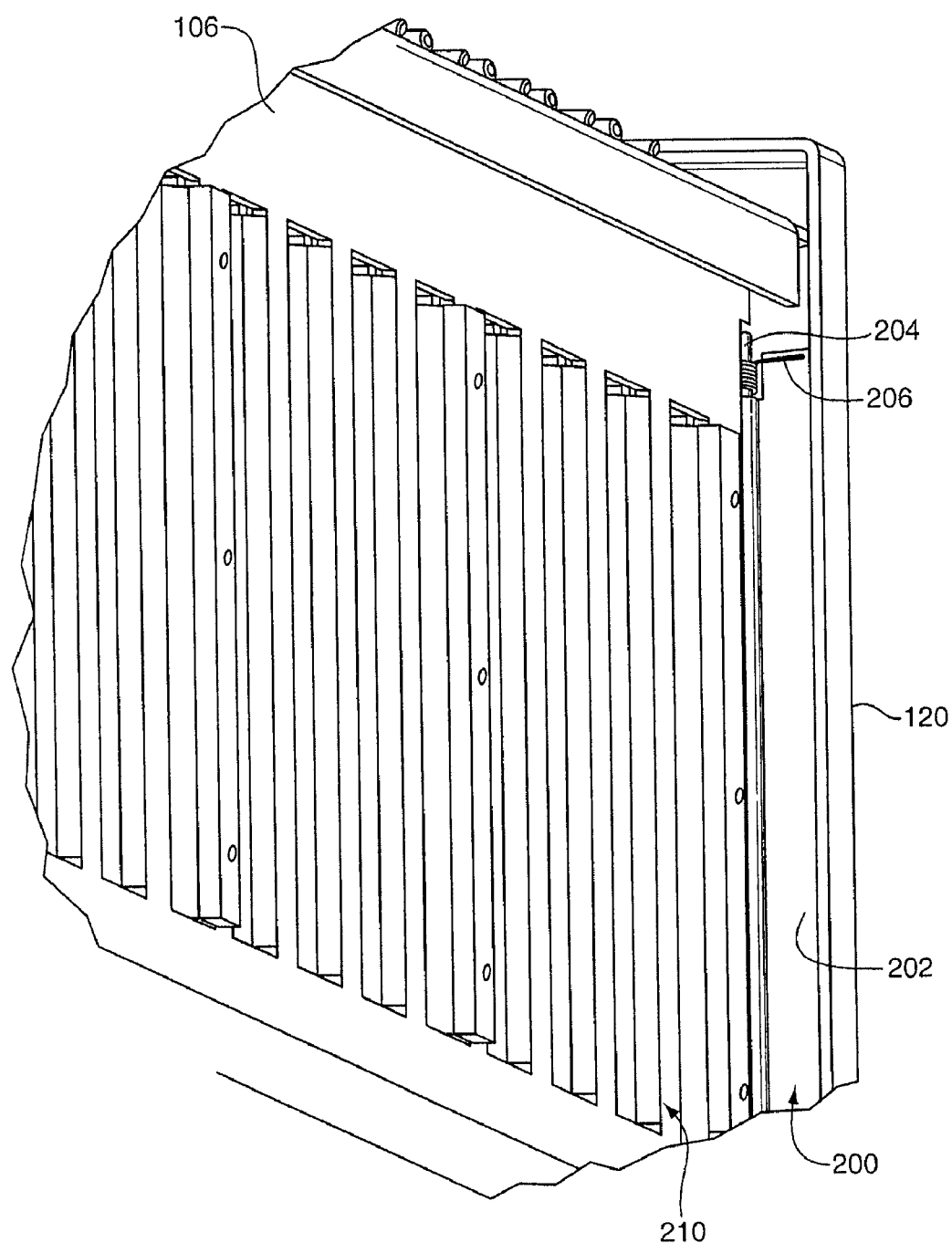
FIG. 8 is an illustration of vent sealing according to an embodiment of the present invention.

Referring now to FIG. 8, an illustration of vent sealing according to an embodiment of the present invention is shown. Flap assembly 200 is installed in man fold 106. Flap 202 is biased by spring 206 against vent openings, which may be in either front face 120 or rear face 170. When module 100 is inserted into secondary packaging, a protrusion in the secondary packaging forces flap 120 against spring 206, allowing air to pass through the vent openings.

Figure 9:
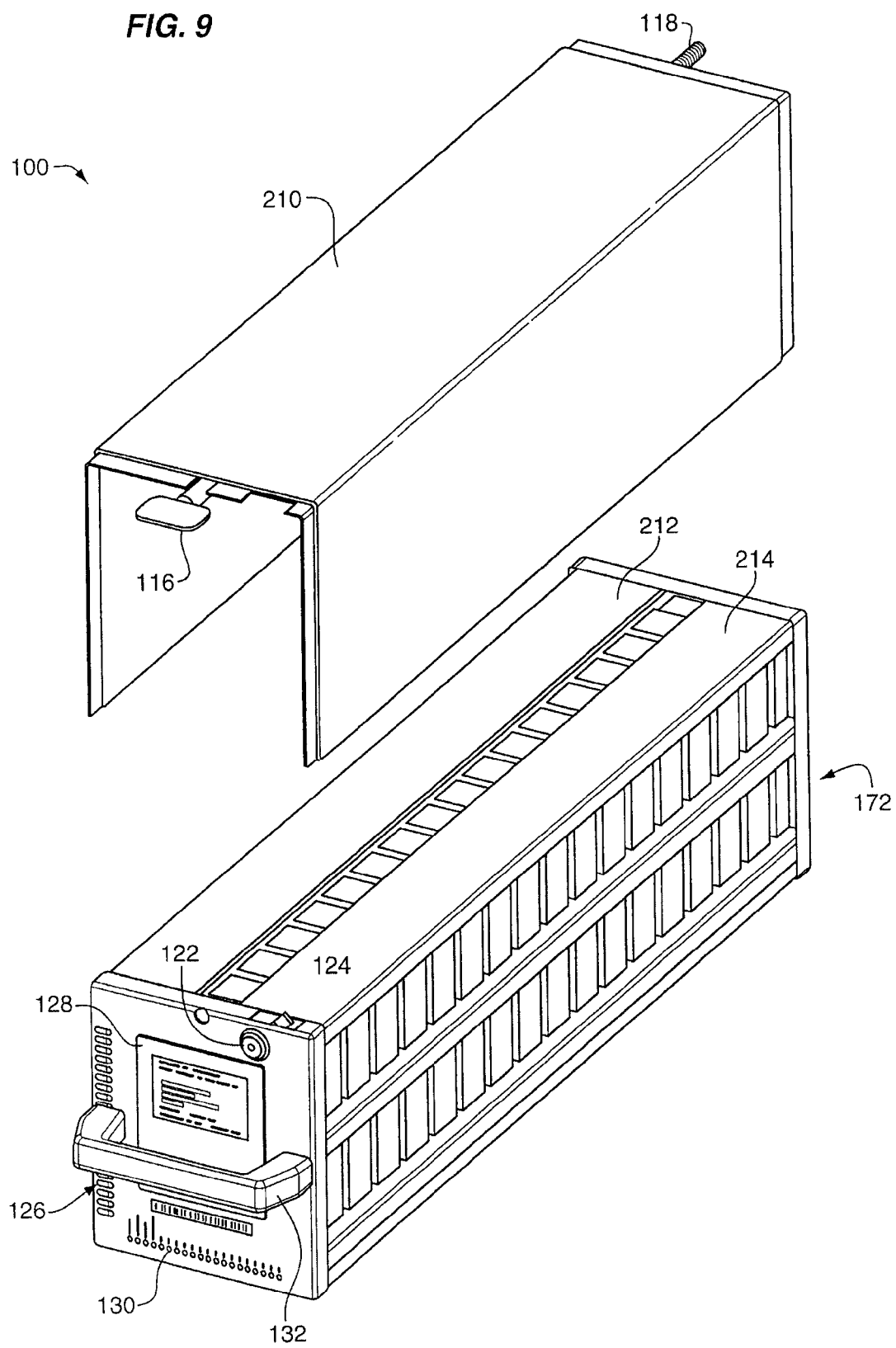
FIG. 9 is an alternative embodiment for a storage module according to the present invention.

Referring now to FIG. 9, an alternative embodiment for a storage module according to the present invention is shown. Module 100 is shown with wrap-around top cover 210 removed. In this embodiment, storage modules 102 are protected from shock by resilient left manifold 212 and resilient right manifold 214. Manifolds 212, 214 may include gaps or may be made of a porous material so as to allow air to flow from rear vent openings 172, along and through right manifold 214, around sub-modules 102, through and along left manifold 212, and out front vent openings 126.

Figure 10:
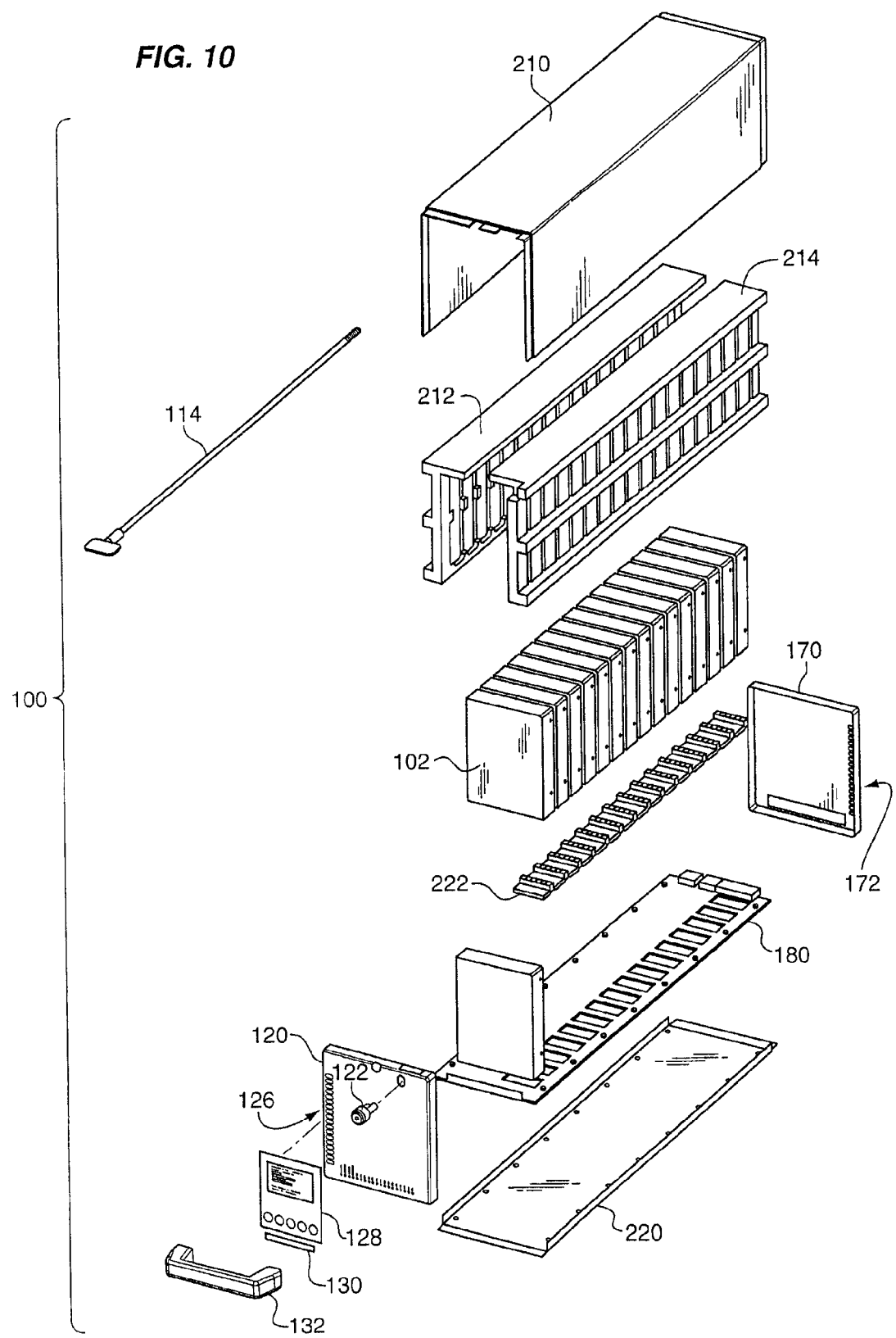
FIG. 10 is an exploded view of an alternative embodiment according to the present invention.

Referring now to FIG. 10, an exploded view of an alternative embodiment according to the present invention is shown. Sub-modules 102 are encased by left manifold 212 and right manifold 214. Printed wiring board 180 is affixed to bottom cover 120. Sub-modules 102 are connected to printed wiring board 180 through flexible connector assembly 222. Flexible connector assembly 222 may comprise individual flexible cabling for each sub-module 102 or may be a single connector system, such as a daisy chain connection, interconnecting sub-modules 102 and printed wiring board 180. Top cover 210 fits over manifolds 212, 214 and onto bottom cover 220. Front face 120 and rear face 170 complete the enclosure.

Figure 11:
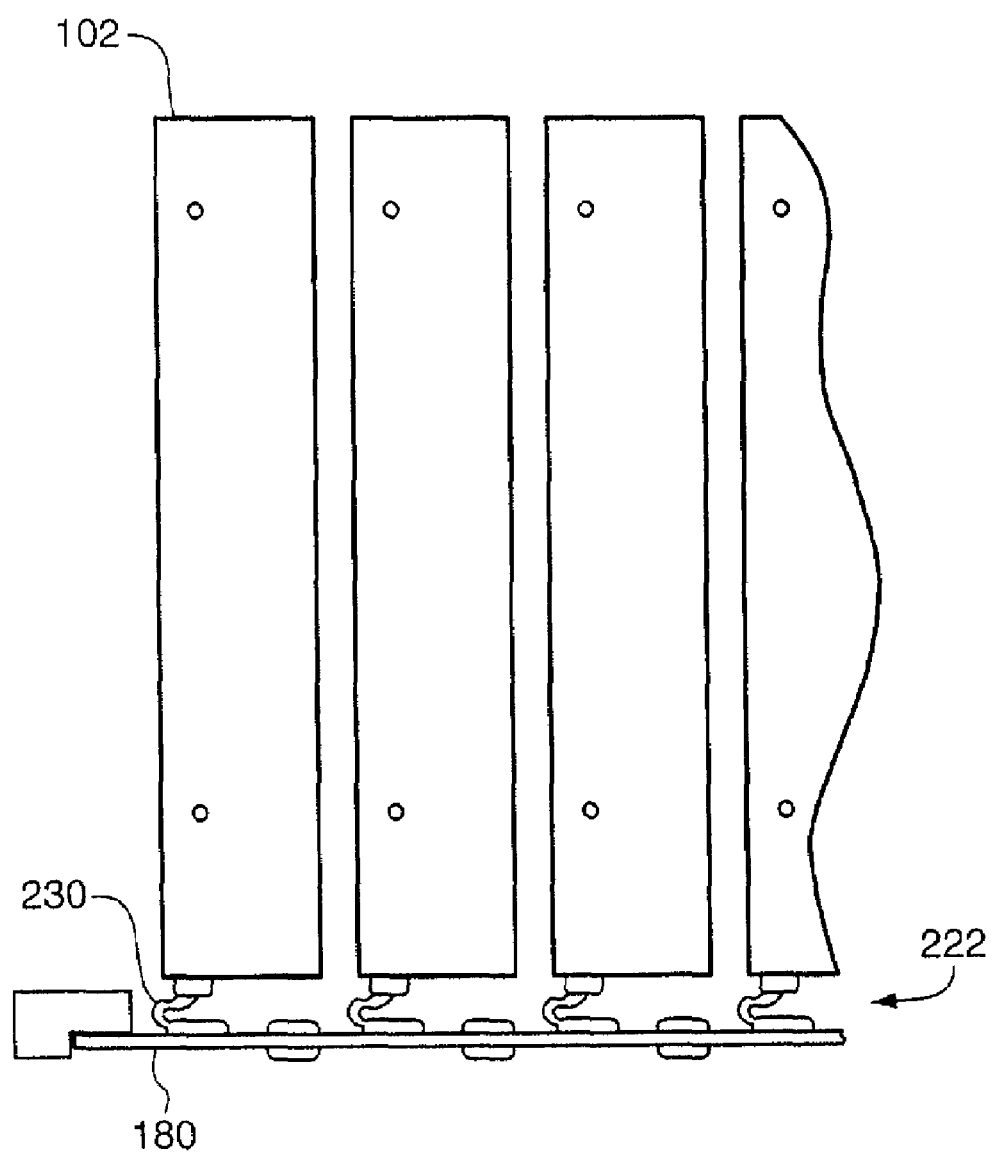
FIG. 11 is an illustration of flexible connectors according to an embodiment of the present invention.

Referring now to FIG. 11, an illustration of flexible connectors according to an embodiment of the present invention are shown. Sub-module 102 is interconnected with printed wiring board 180 through flexible cable 230, which is part of flexible connector assembly 222. Flexible cable 230 has sufficient length to permit connecting to sub-module 102 assembled between manifolds 212, 214.

Figure 12:
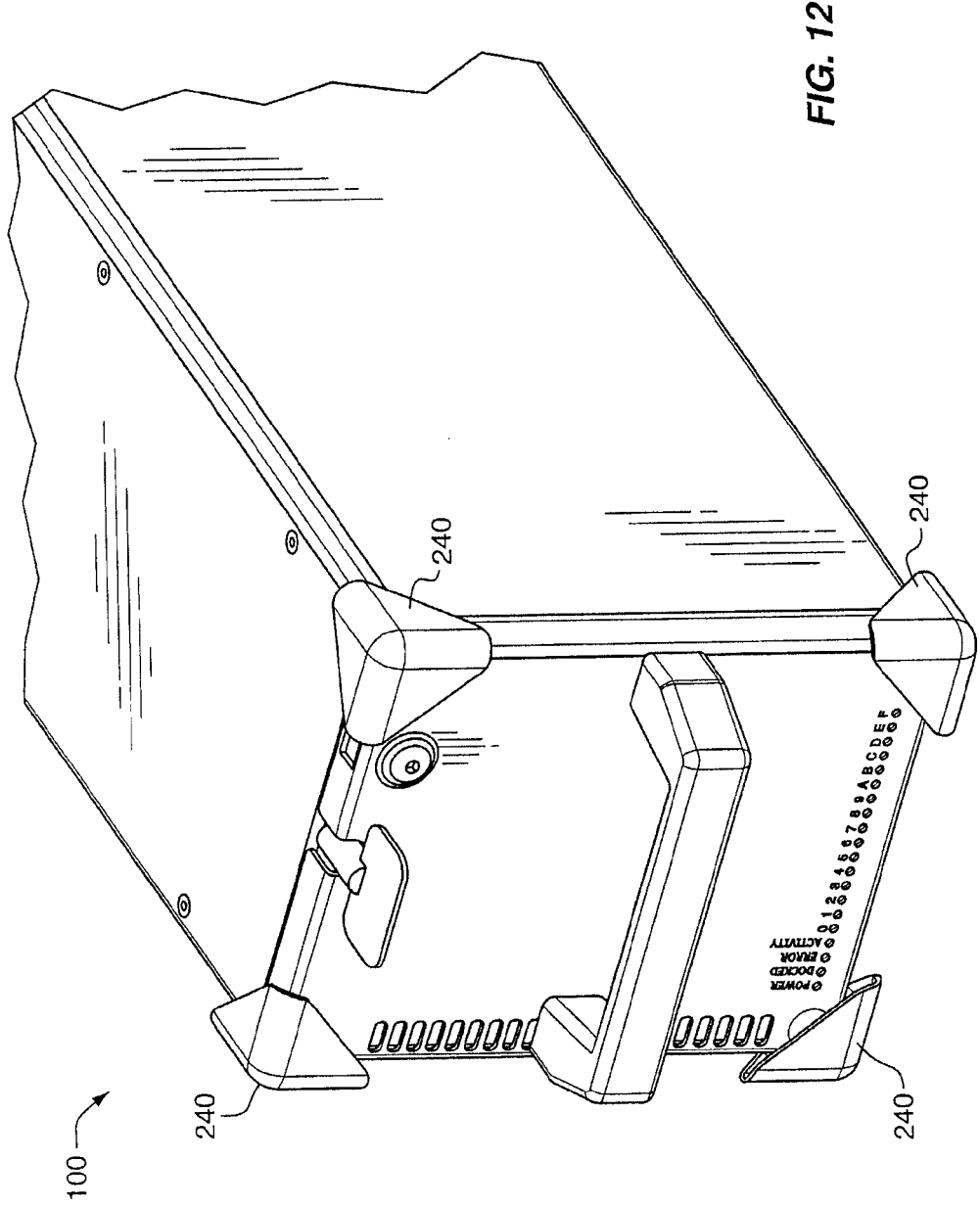
FIG. 12 is an illustration of corner shock absorbers according to an embodiment of the present invention.

Referring now to FIG. 12, an illustration of corner shock absorbers according to an embodiment of the present invention is shown. In addition, or as an alternative, to other shock limiting systems, module 100 can incorporate shock absorbing corners 240. Corners 240 may be constructed of the same material used in shock absorbing frame 160 and may include anti-abrasive strips similar to strips 162. Corners 240 may be adhered or fastened to module 100.

Figure 13:
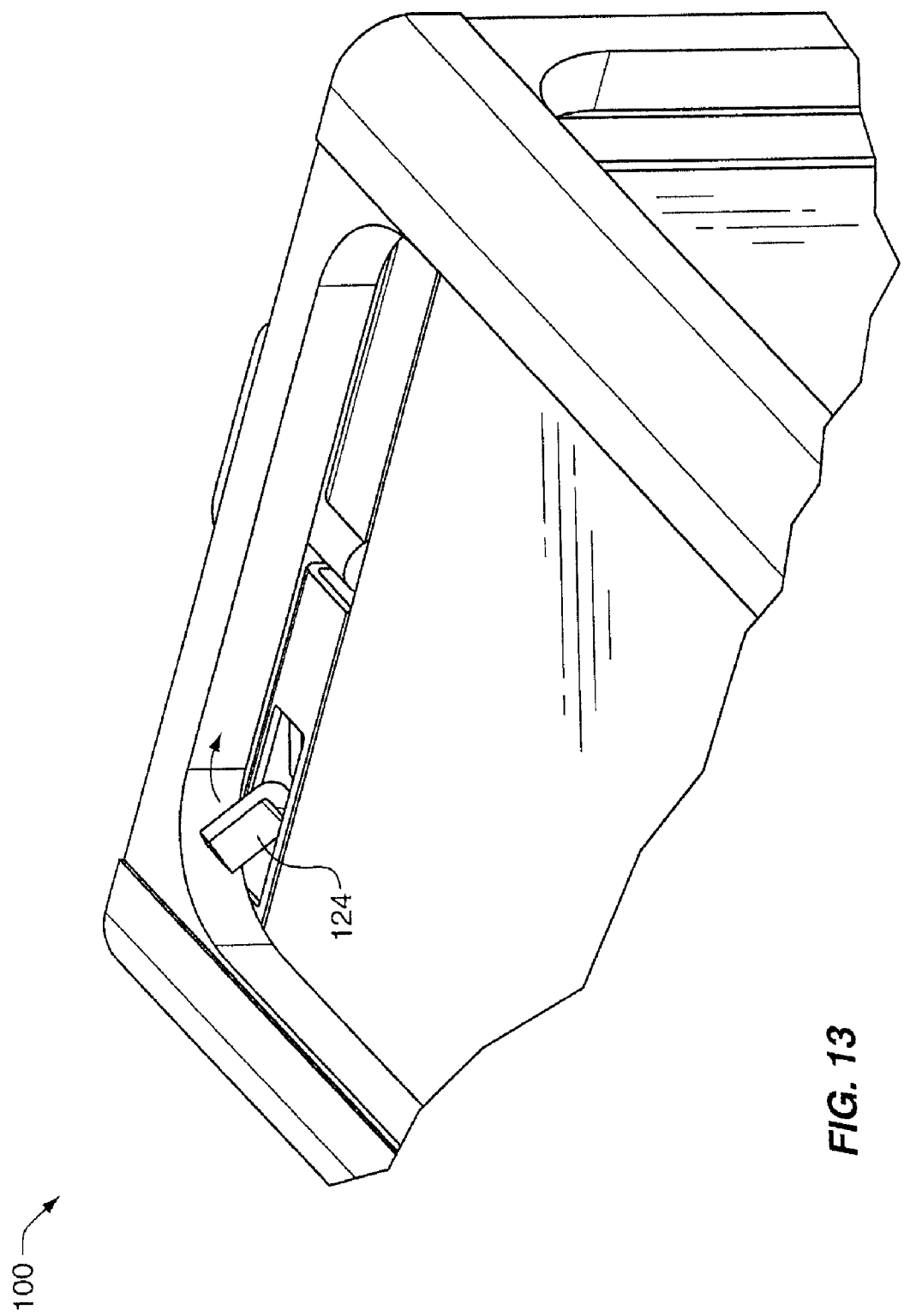
FIG. 13 is an illustration of a storage module locking mechanism according to an embodiment of the present invention.

Referring now to FIG. 13, an illustration of a storage module locking mechanism according to an embodiment of the present invention is shown. Module 100 includes tab 124 rotating out of module 100 upon the operation of a key in lock 122. Tab 124 engages a slot in secondary packaging to prevent the removal of module. Lock 122 may be operated manually or by automated machinery.

Figure 14:
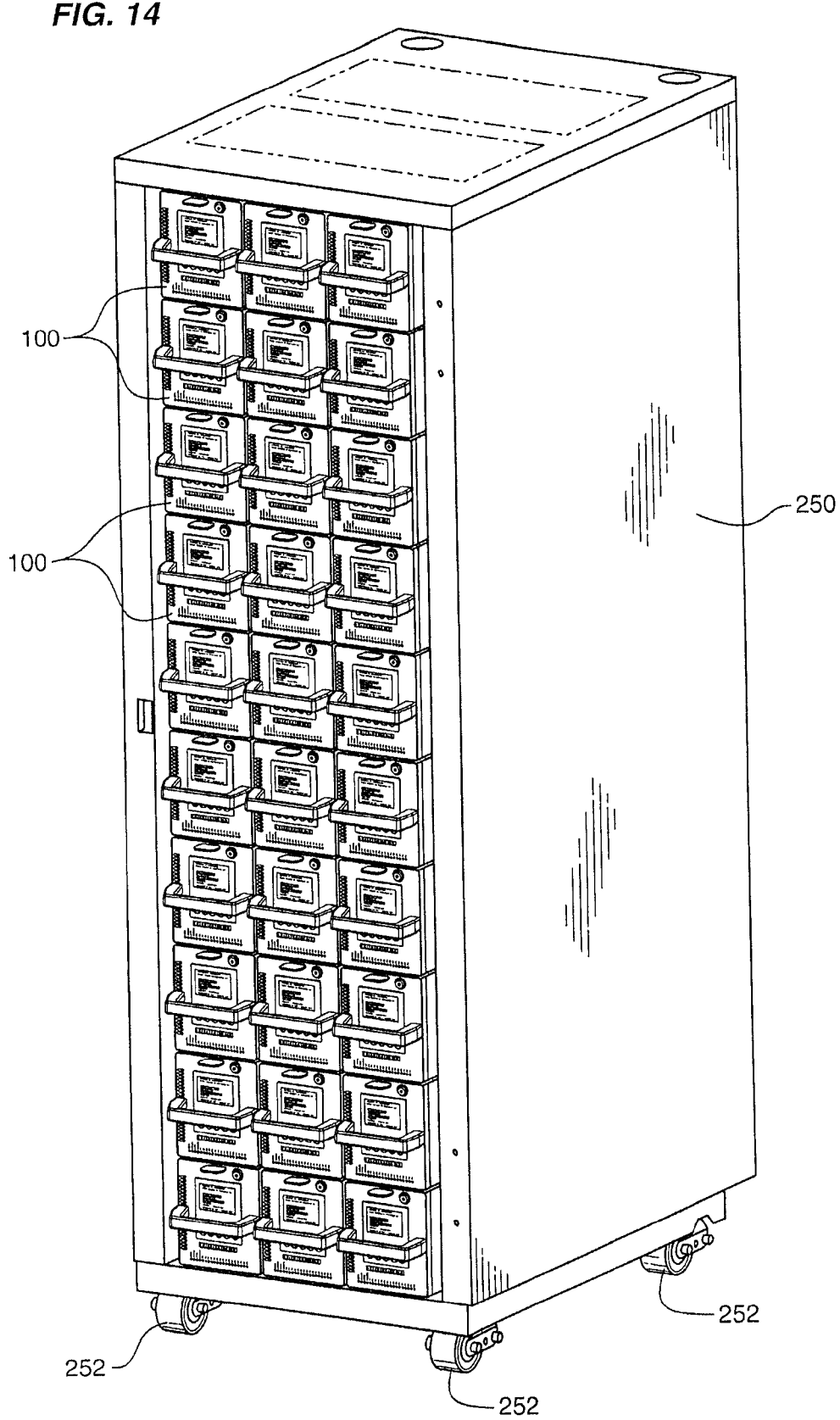
FIG. 14 is an illustration of a module rack according to an embodiment of the present invention.

Referring now to FIG. 14, an illustration of a module rack according to an embodiment of the present invention is shown. Equipment rack 250 forms secondary packaging for holding many modules 100. In the embodiment illustrated, rack 250 is capable of supporting thirty modules 100. As will be recognized by one of ordinary skill in the art, other sizes and configurations for rack 250 are possible. In the embodiment illustrated, rack 250 has wheels 252 for moving rack 250.

In one embodiment, one or more slots of rack 250 is used for power, cooling air, storage controller, network functions, and the like. These functions may also be built into the back, top, sides and/or bottom of rack 250.

Rack 250 may implement a wide variety of system capability. At a high level of capability, rack 250 includes host connections and storage controllers for handling multiple simultaneous high-bandwidth accesses to storage modules 100. A lower level of capability is provided through only one controller and one external connection for rack 250. A still lower level of capability is to provide only enough power, bandwidth and other support to operate one sub-module 102 within any module 100 in rack 250. Another step down in capability is to provide only enough power to maintain internal memory for all modules 100. Further down is to supply only enough power to read information in identification tags for one or a few of modules 100. At the lowest level of capability, rack 250 is nothing more than shelf space for holding modules 100.

Figure 15:
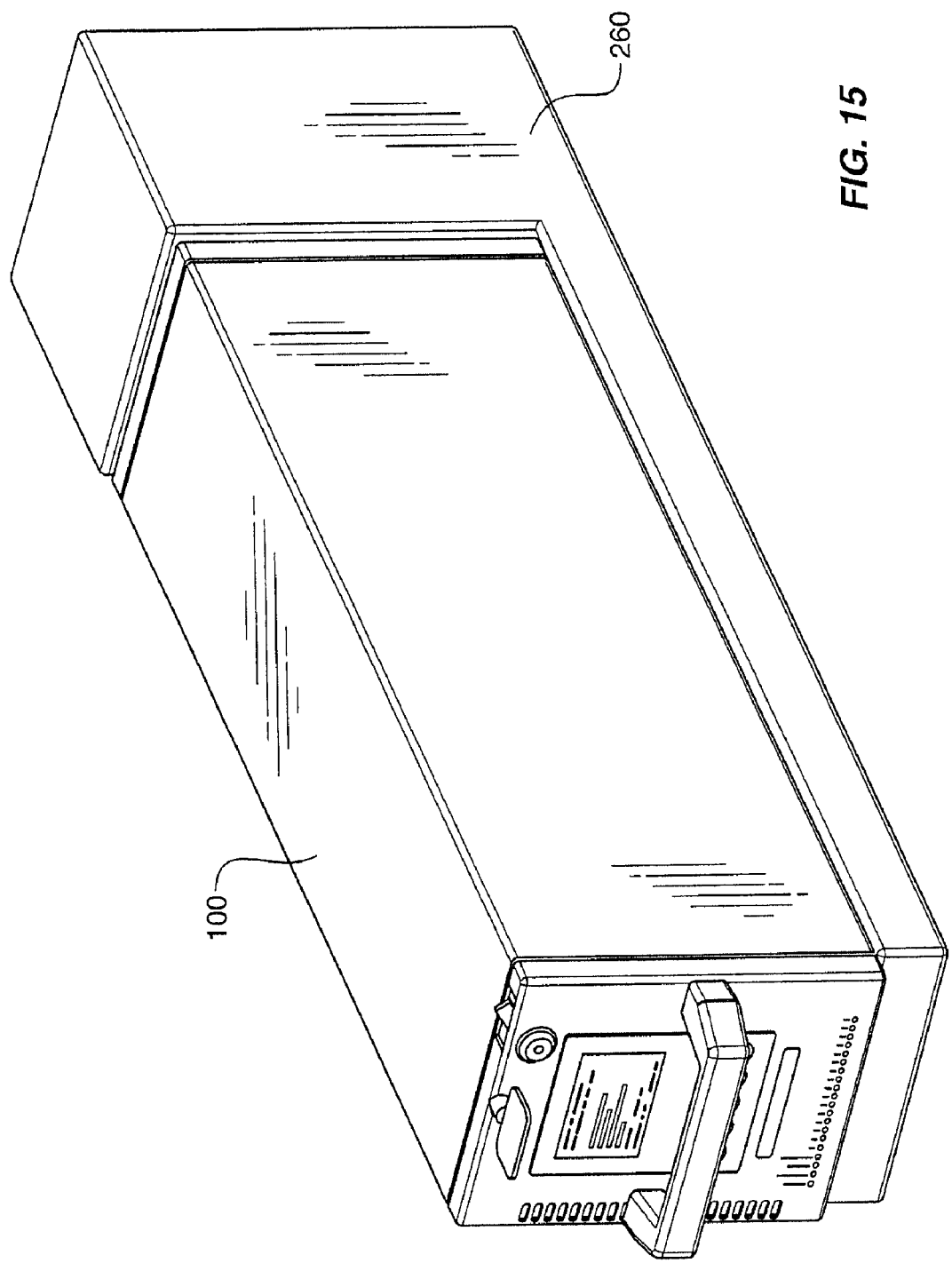
FIG. 15 is an illustration of a module docking station according to an embodiment of the present invention.

Referring now to FIG. 15, an illustration of a module docking station according to an embodiment of the present invention is shown. Docking station 260 represents another secondary packaging system accepting modules 100. Docking station 260 is designed to accept one module 100. Other variations may accept a small number of modules 100. Docking station 260 provides power, cooling, controller and interface functions for module 100. This permits one, or a few, modules 100 to be used for "desk top" applications or for rapid or remote access to information held in modules 100.

Figure 16:
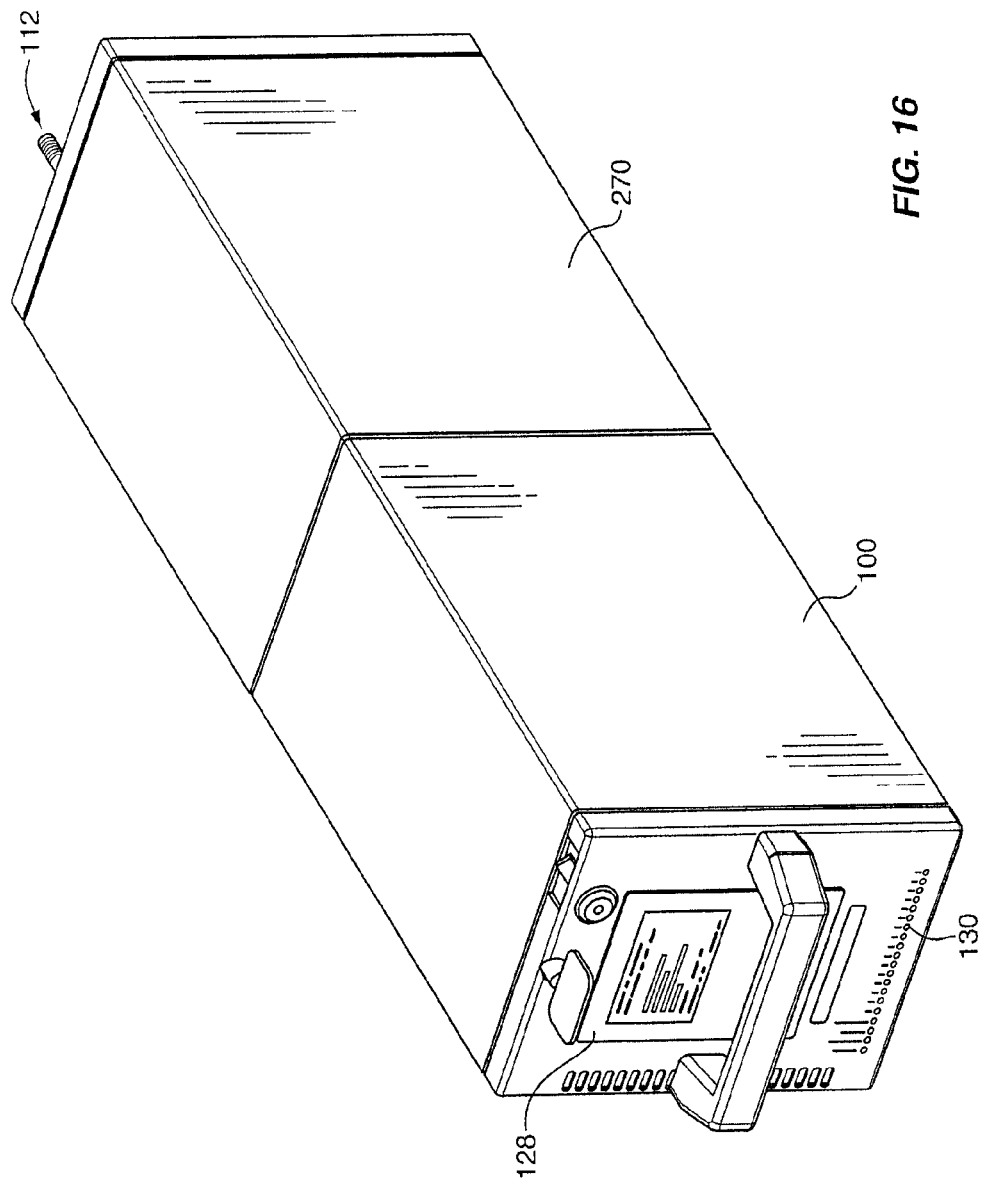
FIG. 16 is an illustration of a reduced size storage module according to an embodiment of the present invention.

Referring now to FIG. 16, an illustration of a reduced size storage module according to an embodiment of the present invention is shown. Reduced length module 100 has room for one-half the number of sub-modules 102 as can be accommodated in full-sized module 100. Reduced length module 100 is joined to extender 270 for use in secondary packaging such as rack 250 or docking station 260. Extender 270 passes electrical connection through to module 100, vents cooling air to module 100, and extends retention system 112.

Extender 270 may or may not contain modules 100. If extender 270 is designed to accept sub-modules 102, user interface 128 and displays 130 provide input and reflect the status for extender 270 and sub-modules 102 within extender 270 as well as for module 100.

Figure 17:
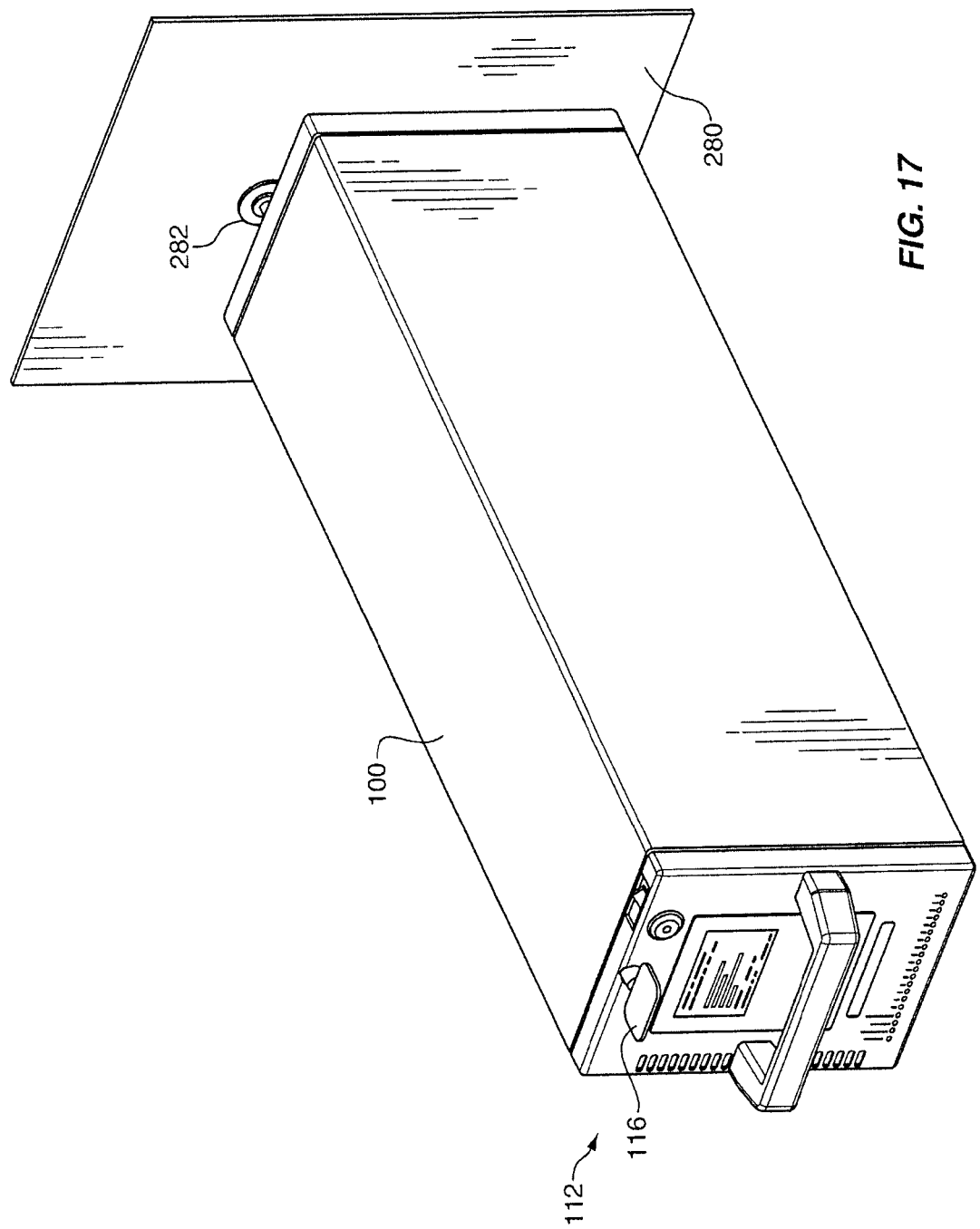
FIGS. 17-19 is an illustration of secondary packaging module retention according to an embodiment of the present invention.
Figure 18:
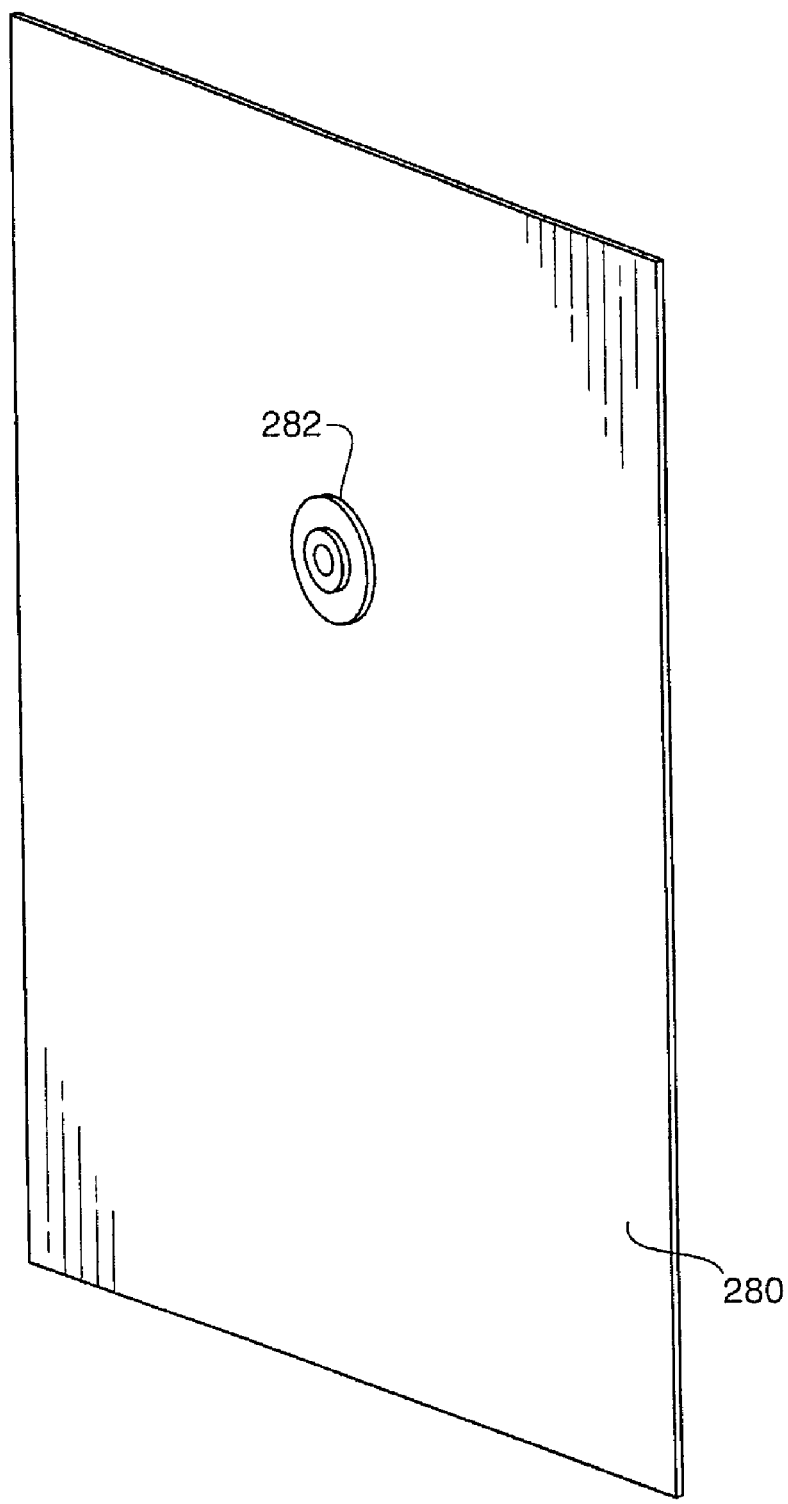
Figure 19:
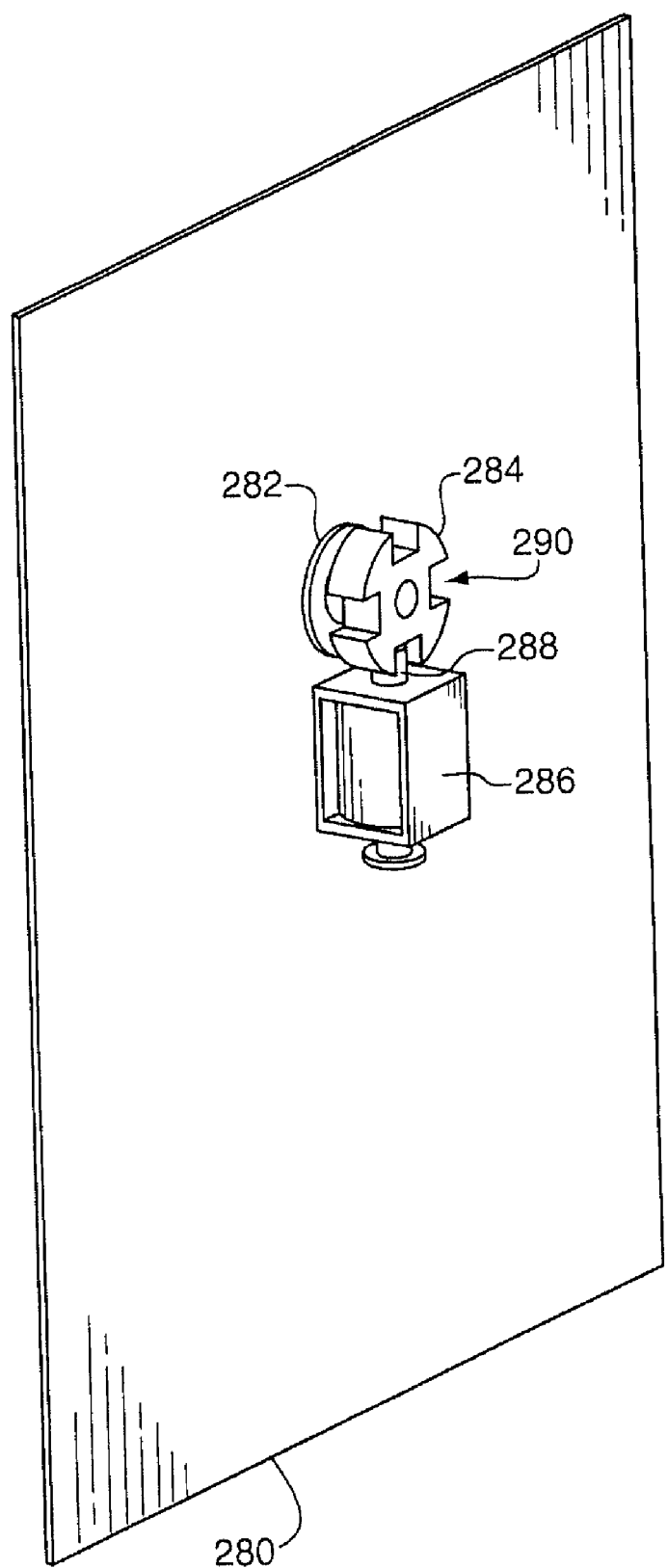

Referring now to FIGS. 17-19, an illustration of secondary packaging module retention according to an embodiment of the present invention is shown. FIG. 17 illustrates module 100 held to back wall 280 by retention system 112. Back wall 280 may be part of rack 250, docking station 260, or the like. Back wall 280 includes opening 282 on the front side of back wall 280, as illustrated in FIG. 18. Opening 282 accepts threaded portion 118 of shaft 114 in retention system 112. The back side of back wall 280, illustrated in FIG. 19, includes slotted wheel 284 affixed to rotate relative to opening 282.

To engage module 100, solenoid 286 extends shaft 288 to hold slotted wheel 284 stationary. Paddle 116 is then rotated, either manually or by automated equipment, to thread portion 118 of shaft 114 into threaded hole 290 of slotted wheel 284. This action seats module 100. During access of module 100, solenoid 286 retracts shaft 288, permitting wheel 284 to rotate. Turning paddle 116 at this point will not unthread shaft 114 from wheel 284, preventing module 100 from being pulled away from back wall 280. Solenoid 286 reengages wheel 284 with shaft 288 for removal of shaft 114 from opening 282. Solenoid 286 may be controlled to prevent removal of module 100 during data transfer between module 100 and secondary packaging.

As will be recognized by one of ordinary skill in the art, other retention systems are possible. For example, a lever arm may be used to provide a latched insertion of canister connectors 174 via a cam mechanism that properly aligns connectors and provides even insertion pressure. The lever arm protrudes from module 100 to first provide a stop to prevent excessive force on connectors 174.

Figure 20:
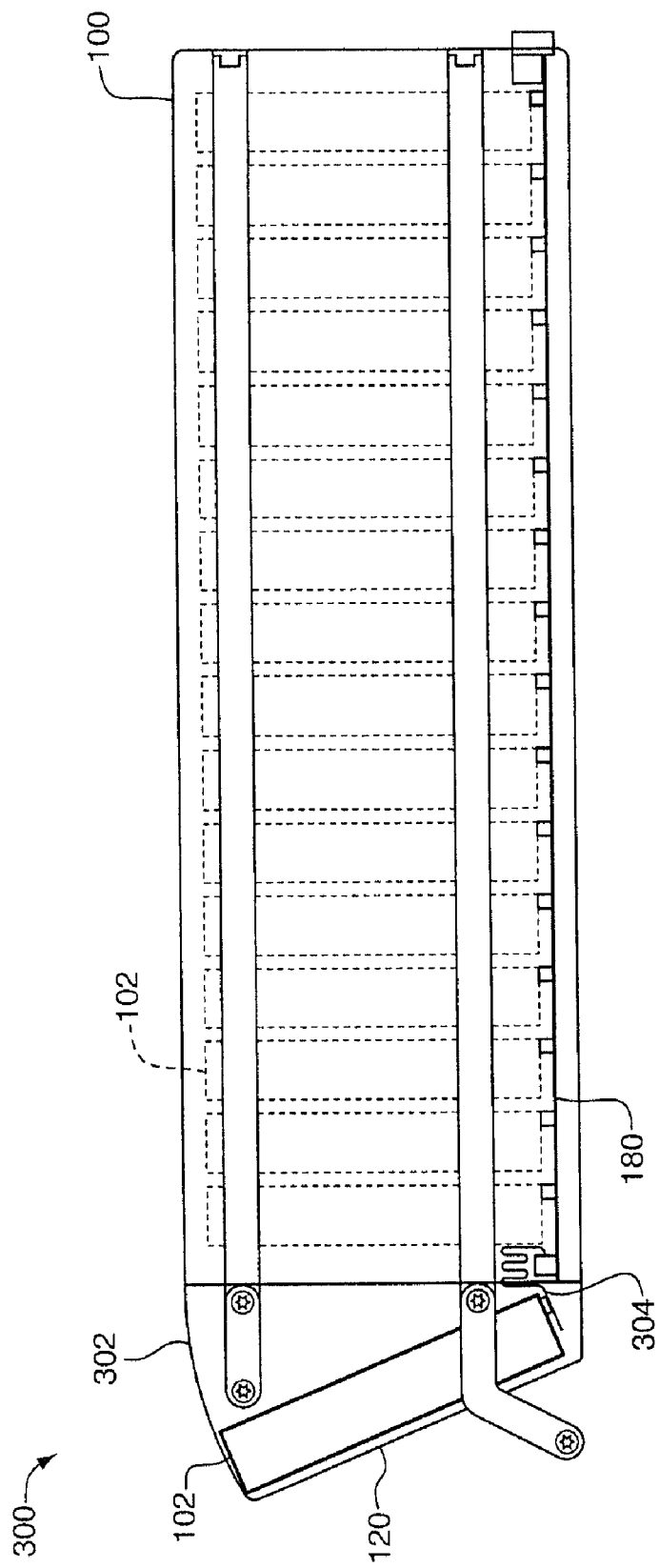
FIG. 20 is an illustration of a storage module with a sub-module access port according to an embodiment of the present invention.

Referring now to FIG. 20, an illustration of a storage module with a sub-module access port according to an embodiment of the present invention is shown. Module 100 may incorporate a sub-module access port, shown generally by 300. Port 300 includes hinged tray 302 that rotates front panel 120 open, permitting access to the first sub-module 102 in module 100. Sub-module 102 is connected to printed wiring board 180 through long flexible cable 304. This permits sub-module 102 to be withdrawn from module 100. Sub-module 102 may then be disconnected from flexible cable 304 and a new sub-module 102 connected and inserted into module 100. First sub-module 102 may contain a removable media storage device. Removable media may be loaded into or removed from sub-module 102 by opening tray 302.

Figure 21:
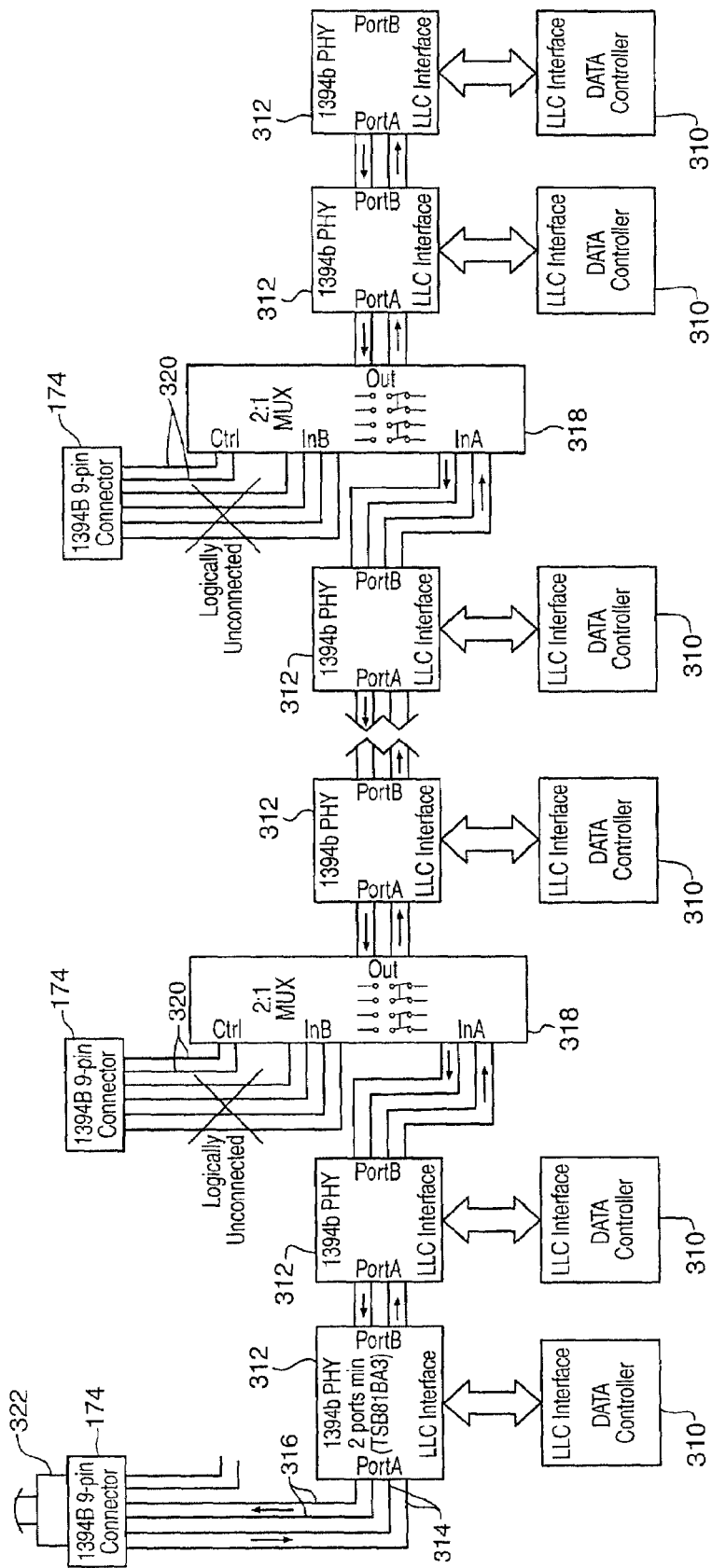
FIGS. 21 and 22 are schematic diagrams illustrating a module with automatic recognition of secondary packaging capability.
Figure 22:
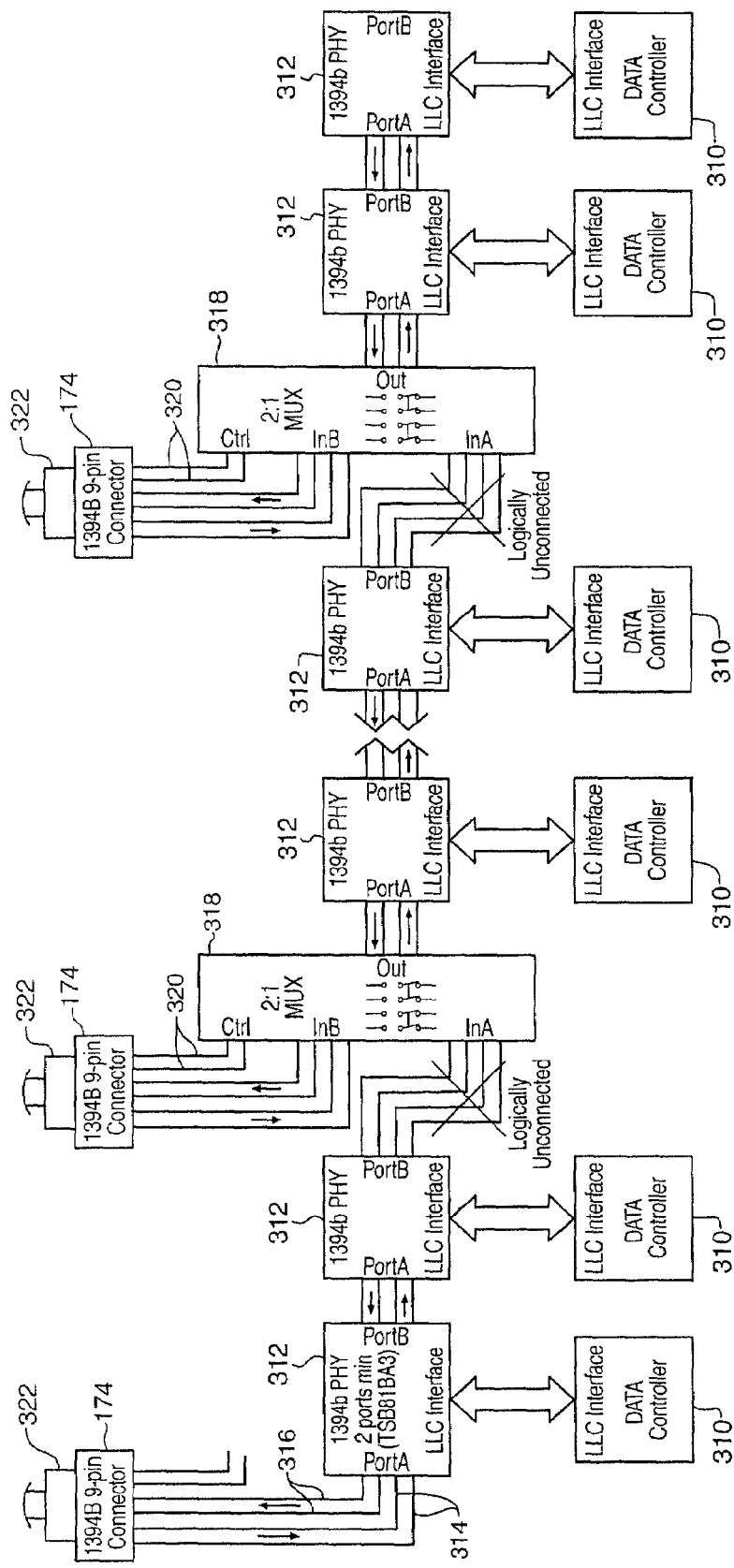

Referring now to FIGS. 21 and 22, illustrations of a module with automatic recognition of secondary packaging capability is shown. Sub-modules 102 within module 100 may be interconnected and intraconnected through a variety of means. For example, parallel cabling may be used between storage sub-modules 102 and controller sub-modules 102. Preferably, one or more high speed serial corrections are used.

FIGS. 21 and 22 illustrates module 100 with one data controller 310 for each sub-module 102. Data controller 310 converts parallel ATA information into serial IEEE 1394 information. Each data controller 310 connects to a three-port cable transceiver/arbiter 312 which interfaces the controller serial data stream with a common data stream represented by transmit (Tx) pair 314 and receive (Rx) pair 316. Each pair of transceiver/arbiters 312 is separated from an adjacent pair 312 by multiplexer 318. Multiplexer 318 switches communication paths 314, 316 between either adjacent communication paths 314, 316 or output connector 174 passing signals into and out of module 100 based on control input 320. Control input 320 is determined from a power signal received through connector 174.

If an active IEEE 1394 connector, in secondary packaging to which module 100 is mounted, is plugged into connector 174, control input 320 routes communication signals 314, 316. If an active IEEE 1394 connector is not plugged into connector 174, control input 320 routes communication signals 314, 316 to adjacent communication signals 314, 316. For the example shown in FIG. 21, only one active IEEE 1394 connector is connected to a corresponding module connector 174. Multiplexers 318 are automatically configured to pass all data into or out of module 100 through one connector 174. For the example shown in FIG. 22, each module connector 174 is connected to an active IEEE 1394 connector 322. Multiplexers 318 are automatically configured to pass data for each pair of controllers 310 into or out of an associated connector 174. Thus, the same module 100 automatically supports different secondary packaging data rates.

Figure 23:
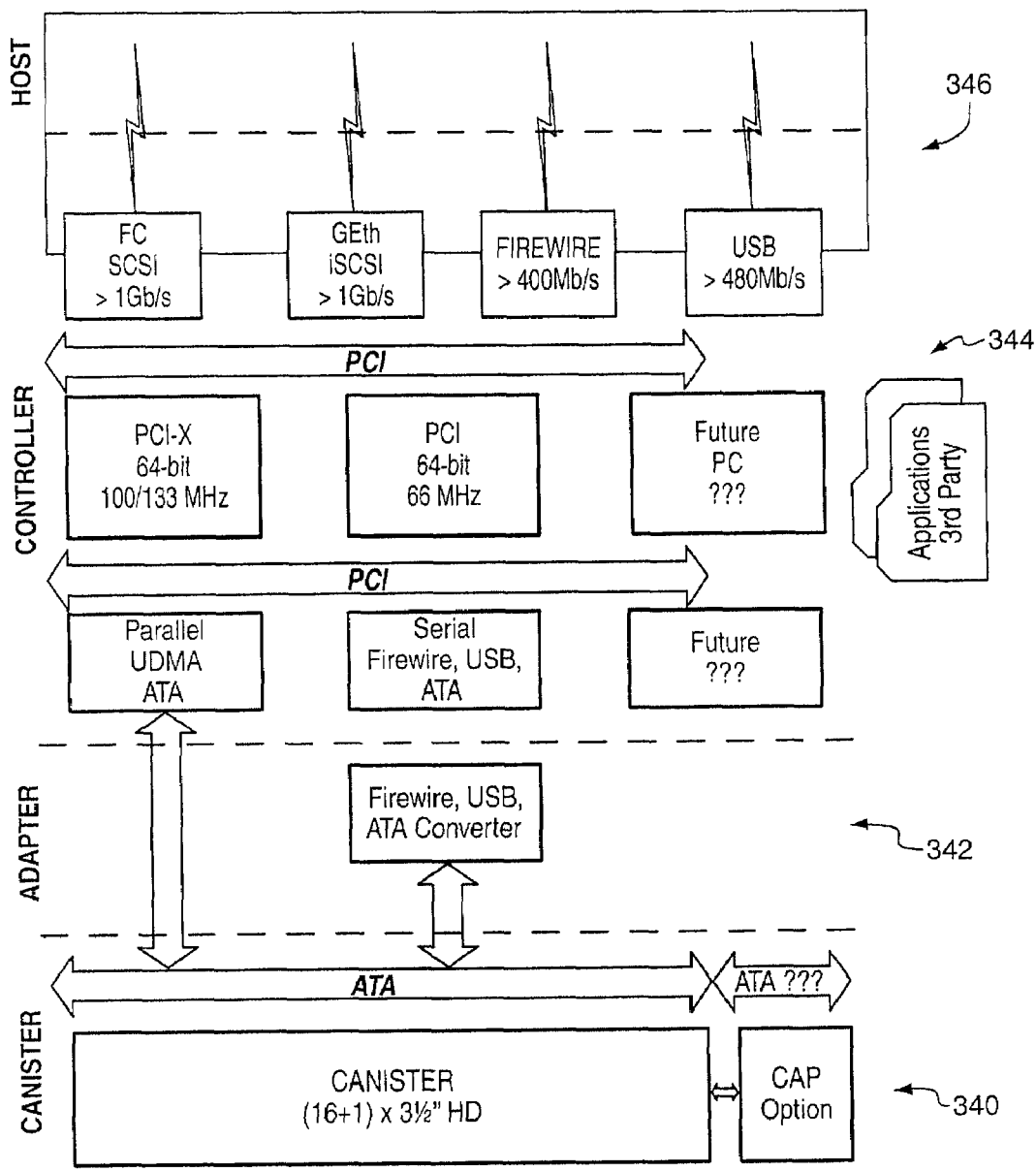
FIG. 23 is a block diagram illustrating controller hierarchy according to an embodiment of the present invention.

Referring now to FIG. 23, a block diagram illustrating controller hierarchy according to an embodiment of the present invention is shown. The canister hierarchy operates at four levels. Canister level 340 represents operation of sub-modules 102 within module 100. Adapter level 342 represents data formatting between sub-modules 102 and one or more controllers. The adapter level may be implemented within each sub-module 102, within each module 100 for sub-modules contained within the module 100, within one module 100 in support of sub-modules 102 in a plurality of modules, within secondary packaging, and the like. Controller level 344 represents higher level interface functions including data transformation, data amalgamation such as framing, protocol conversion, backup and other data transfer operations, data compression, data encryption, authentication, RAID operations, virtualization, scheduling, maintenance and self-management, status and error processing, and the like. The controller level may be implemented by a special purpose sub-module 102 within each module 100, by a special purpose module 100 within rack 250 of modules 100, or by secondary packaging. Host level 346 represents data producers and consumers accessing storage.

The present invention allows a function sophistication nesting to be supported so that costs can be kept to a minimum in the units that are replicated the most with the more expensive technologies being relegated to the sections of the subsystem with the fewest instances of existence. One example is the use of Fire Wire (IEEE 1394) or USB connector for each disk, concentrated into Ethernet for each module 100, with these being concentrated into fiber channel for each controller. Another example is the use of inexpensive processors in module 100 to manage disks that are individually powered up, thus eliminating the need for a processor in each disk drive. The inexpensive processor, in turn, relies on the help of a more powerful processor in rack 250 associated with the slot holding module 100. The powerful processor can be amortized across all modules 100 that can be plugged into that slot.

Module 100 can include interfaces that allow attachment of additional functionality such as, for example, a PMC connector that accepts a processor or memory containing an application to be mounted directly on module 100. This allows for functions like parallel processing of data stores to be executed. An application, such as a parameter driven query, could be multicast and directed to the processing function in each module 100 of a storage system. Then the data could be evaluated in each module 100 in parallel with all the other modules 100 with the results being cast back to the query origination point for compilation.

Each module 100 can include a multilevel hierarchy of storage such as, for example, having a cache for disks of solid state memory or nano devices. Accessing different levels can be made available in different stages. For example, the power to drive a solid state memory, which may contain metadata and index information, may be significantly less than that necessary to drive a disk drive. When module 100 is first inserted into secondary packaging, the solid state memory can be activated long before any disk storage could come ready. This is especially true of technologies that require even less power to access, such as RF chips.

A variety of techniques may be employed, such as RAID 0, 1, or 5 along with single or multiple parity, within a single module 100 for establishing specific performance and reliability levels that may be dynamically altered by demand. The stripe width and the number and style of redundancy components used can be changed dynamically depending on changing circumstances in the operational requirements such as specific demand explicitly requested externally (e.g., for higher reliability), implied demand due to reaching limitations set by a policy engine interface (e.g., wider striping when demand for data reaches a threshold), and the like. In addition, techniques employed within a single module 100 for establishing specific performance and reliability levels may be dynamically altered depending on changing circumstances in the operational environment such as, for example, if a disk drive in module 100 has failed and must be mapped out of use and the data reconstructed. Apparent conflicting requirements such as, for example, performance specification requiring more drives than are available in a single canister, may be resolved by combining the resources of more than one canister. In addition, capacity that has been delegated (and maybe already used) for storing redundancy information may be reallocated and used for data storage, thus extending the ability to respond to immediate data storage requirements. Conversely, a demand for increased data integrity can be met by reallocating storage capacity to redundant information storage.

The specified or implied capacity of a single virtual entity can be altered dynamically (made larger or made smaller) without requiring reconfiguration. If the capacity of a virtual data grouping, such as a virtual volume, is defined beyond the limits of a single module 100, the capacity of additional modules 100 can be concatenated unless specifically prohibited by command or policy. If specifically requested capacity is not used, it can be recovered and allocated to a different virtual entity either specifically or indirectly via policy or by use. Not all modules 100 of an extremely large virtual entity need be active or even present at all times. Some of a virtual volume may be on modules 100 that have been dismounted and physically moved from the system to an archive facility.

Typically, virtual volumes are explicitly created. However virtual volumes may be created by virtue of a mount command. When created in this implicit manner, a default performance, redundancy, and capacity definition can be used that is specified for the enterprise via specific instruction or via policy interfaces. Once created, the above mechanisms for modifying the definition then apply.

The creation of physical groupings of n+p units to meet performance and redundancy quality of service (QoS) demands is supported where the data is written to only one of the n physical devices at a time. The other n−1 devices need not even be present in the system.

Over time, modules 100 can be built with newer-technologies. The newer technologies will significantly improve functionality and cost for capacities. It is expected that after a very few iterations of technology, an existing module 100 will be viewed as outdated and the customer will prefer to retire module 100 in favor of using the newer ones. This will be especially true when the capacity has increased significantly. For example, the initial module 100 might hold 2 TB and a newer generation might hold 20 TB, making use of the old canister inefficient from a capacity stand point. Slots for modules 100 become a focus of resource management and cost management. New module 100 may be temporarily paired with another slot in rack 250 holding new module 100 or another rack 250. Once paired, the data in any module 100 in companion slot is transferred to new module 100 transparently. All writes to virtual volumes that are in the companion module 100 are directed to a space in new module 100, minimizing the need to read all data from the companion module 100. Once the data from old module 100 is fully copied to new module 100, the pairing is broken and old module 100 can be pulled and retired. The copy operation can also delete data from old module 100 and render the space as empty so that old module 100 can be discarded without any concern for compromising data security. This is especially possible if the copy operation uses a new key structure for encryption. This concept also supports the idea of a perpetual store that has the entire history of all data ever written to the subsystem.

Figure 24:
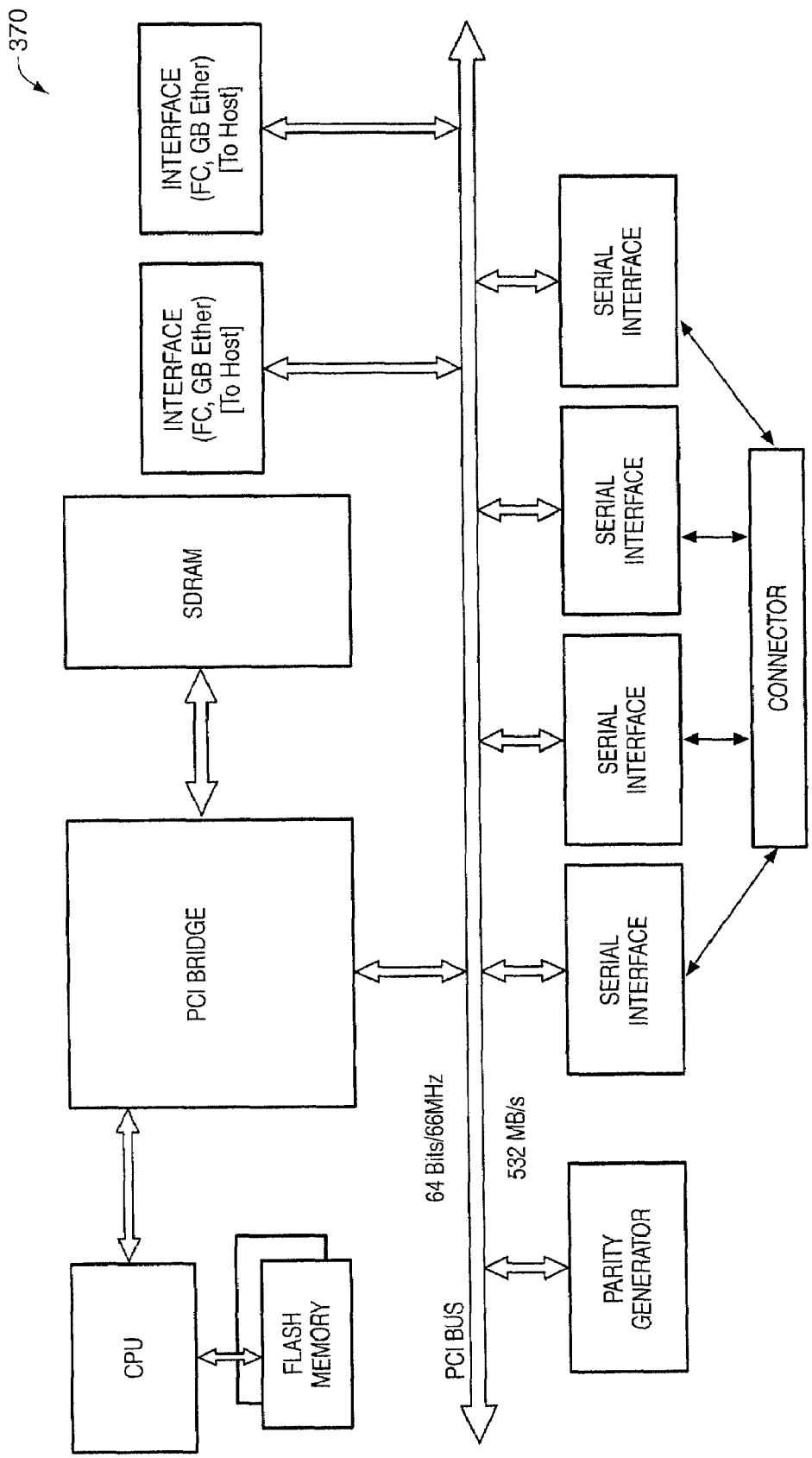
FIG. 24 is a block diagram illustrating a controller according to an embodiment of the present invention.

Referring now to FIG. 24, a block diagram illustrating a controller according to an embodiment of the present invention is shown. Controller 370, such as illustrated in FIG. 24, may be implemented as sub-module 102, module 100, or within secondary packaging.

Figure 25:
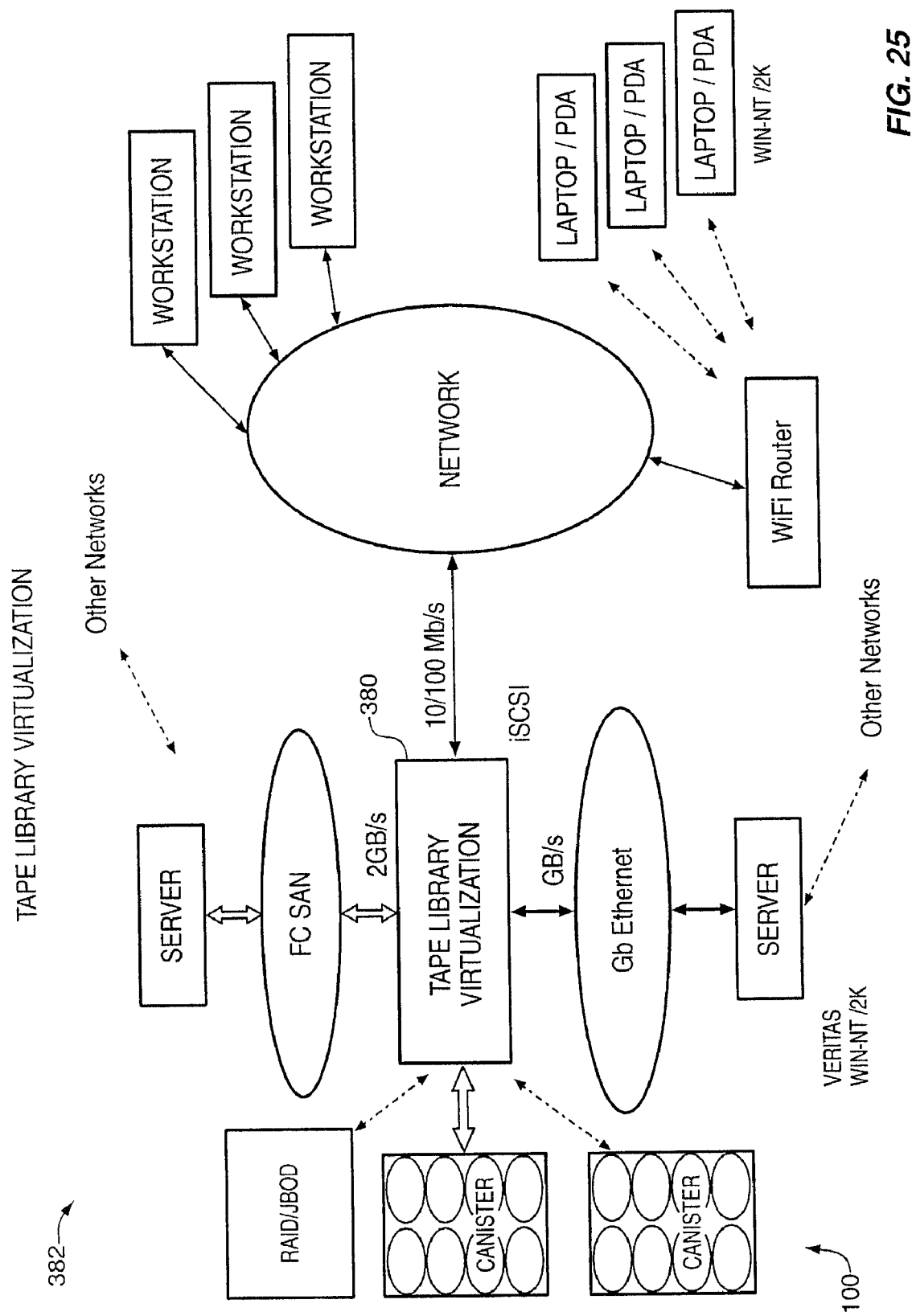
FIG. 25 is a block diagram illustrating a storage system according to an embodiment of the present invention.

Referring now to FIG. 25, a block diagram illustrating a storage system according to an embodiment of the present invention is shown. Tape library virtualization function 380 is implemented in the controller. This permits a disk-based data storage system 382 to appear as a tape library reachable through a variety of means, such as iSCSI over gigabit Ethernet, SCSI over Fibre Channel, file system requests, database access requests, and the like. Storage modules 100 can be configured as JBOD (just a bunch of disks), SAN attached storage, storage controllers, RAID, NAS, and the like.

Figure 26:
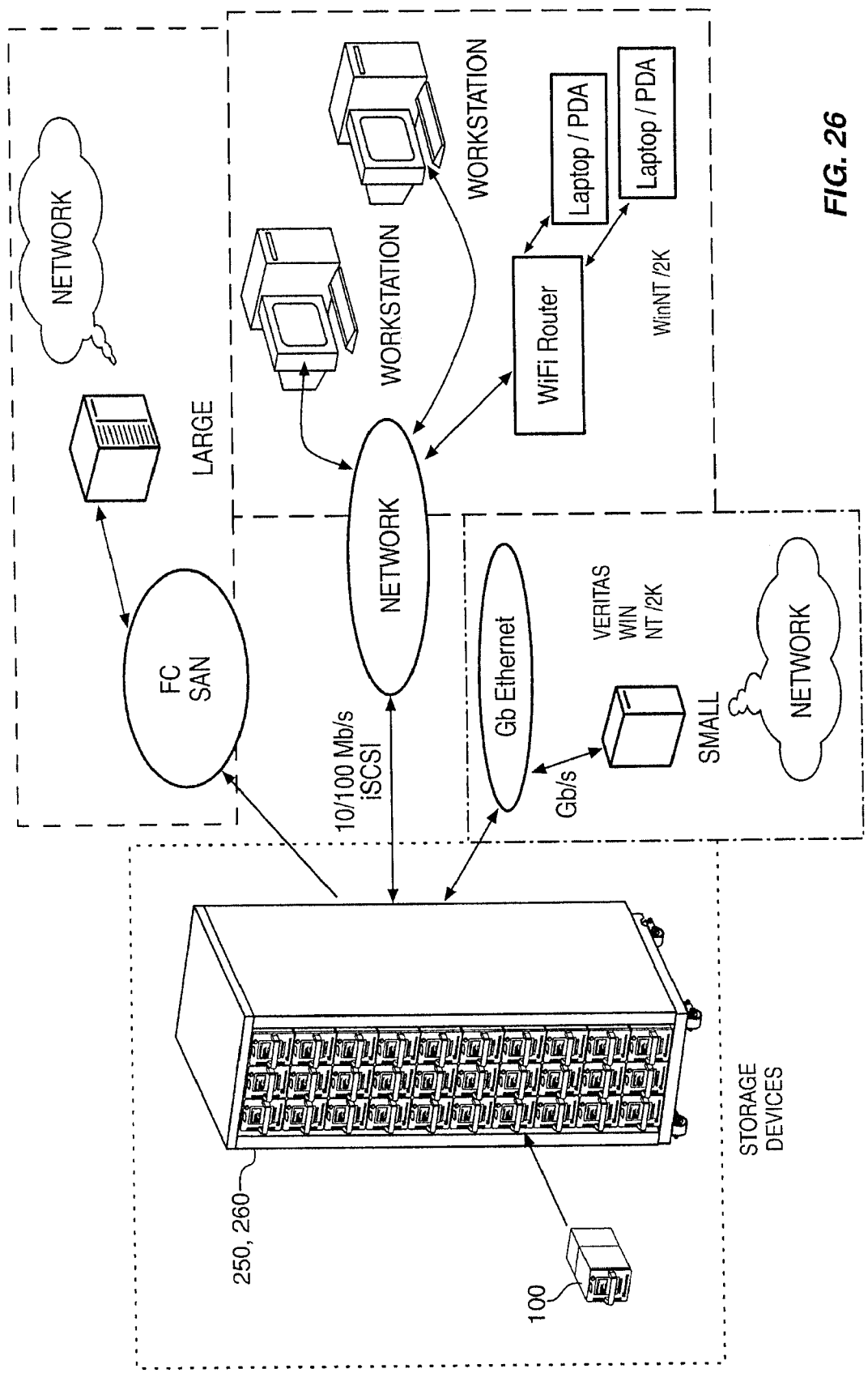
FIG. 26 is a block diagram illustrating enterprise applications according to embodiments of the present invention.

Referring now to FIG. 26, a block diagram illustrating enterprise applications according to embodiments of the present invention is shown. Rack 250 with a plurality of modules 100 satisfies a wide variety of enterprise applications. Storage is easily expandable or contractible from 2-100 TB. One or more controllers present storage media in modules 100 as disk images, tape images, tape libraries, DVD images, and the like. Depending upon available resources, one or more of the device/subsystem virtualizations can be simultaneously operable. Multiple controllers may be used to allow for failover. Each module 100 can be equipped with user interface 128 providing information on module contents, diagnostics, history, ownership, and the like. The option to use one or more of either rack 250 or docking station 260 provides a convenient path for improvements in features and capacity. In addition, higher capacity storage modules 100 may be swapped in for lower capacity storage modules as technology, need and budget permit.

Figure 27:
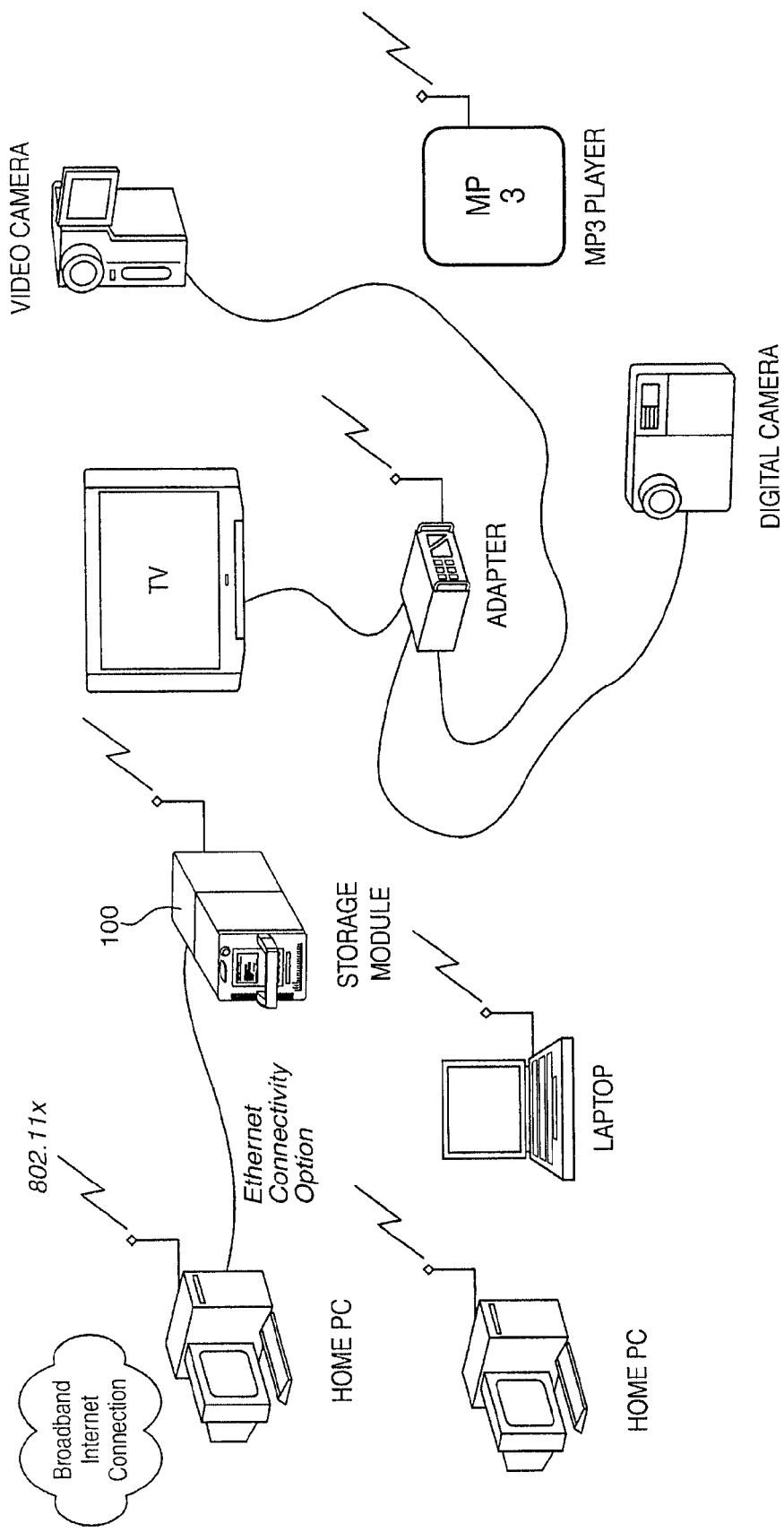
FIG. 27 is a block diagram illustrating a storage module home system according to an embodiment of the present invention.

Referring now to FIG. 27, a block diagram illustrating a storage module home system according to an embodiment of the present invention is shown. Basic module 100 including 400 GB of storage holds approximately 80 movies or 600 CDs. Module 100 requires approximately 12 in.×6.5 in.×5 in. (30 cm.×16.5 cm.×12.5 cm.) of space and weighs approximately 12 lbs. (5.5 kg). Module 100 provides storage for data, video, photographs, audio, email, and the like. Module 100 permits easy backup of computer data and can function as an application server. Module 100 can be docked to docking station 260 with communication capabilities or module 100 can include sub-module 102 supporting communications. Communications include broadband and wireless support. Module 100 can interface to a multimedia adapter for interconnection with home appliances such as televisions, audio equipment, cameras, and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A data storage system comprising:
  a plurality of data storage canisters, each data storage canister comprising:
  a shell;
  a frame disposed within the shell, the frame extending in a lengthwise direction along the shell;
  a plurality of mounting points disposed along the frame, each mounting point operative to accept one module of uniform size, the mounting points spaced such that mounted modules are mounted in a parallel, spaced apart manner;
  A connector system operative to pass electrical signals through the shell;
  a power bus interconnected to the connector system, the power bus operative to deliver power to each module;
  a communication interconnect system operative to transfer signals between each mounted module and the connector; and
  a plurality of data storage modules, each data storage module mounted at one of the plurality of mounting points, each data storage module in electrical contact with the connector system, the power bus and the communication interconnect system;
  the data storage system further comprising secondary packaging for receiving at least one of the plurality of canisters.

2. The data storage system of claim 1 wherein the secondary packaging comprises a data storage rack for holding more than several canisters.

3. The data storage system of claim 1 wherein at least one canister automatically recognizes capabilities of secondary packaging within the data storage system to which the canister is connected.

4. The data storage system of claim 1 wherein the plurality of canisters is a first plurality of canisters, the data storage system further comprising a second plurality of canisters, each canister in the second plurality of canisters having at least one performance characteristic substantially improved over the at least one corresponding performance characteristic in the first plurality of canisters, the data storage system operative to transfer data from at least one of the canisters in the first plurality of canisters to at least one of the canisters in the second plurality of canisters.

5. The data storage system of claim 1 further comprising a docking station accepting one of the plurality of canisters, the docking station operative to communicate with a plurality of appliances.

6. The data storage system of claim 1 wherein the secondary packaging provides at least one capability from a set including power, cooling air, storage controller and network functions.

7. The data storage system of claim 6 wherein at least one of the plurality of data storage canisters automatically recognizes whether or not secondary packaging receives the at least one data storage canister supports the at least one capability.

8. A data storage system comprising:
- a plurality of data storage modules, each data storage module having a module connector system for drawing power and for communicating data and control signals;
- a plurality of canisters, each canister comprising a shell housing a plurality of mounting points, each mounting point operative to mount one data storage module, each canister further comprising a canister connector operative to pass electrical signals through the shell, a power bus within the shell interconnecting the connector system to each mounting point and a communication interconnect system transferring signals between each mounting point and the connector;
- at least one first rack, each first rack comprising a first plurality of slots, each slot in the first plurality of slots operative to receive one of the plurality of canisters, each first rack operative to simultaneously supply power to and exchange communication signals with all canisters received in the first plurality of slots;
- at least one second rack, each second rack comprising a second plurality of slots, each slot in the second plurality of slots operative to receive one of the plurality of canisters, each second rack operative to supply power to and exchange communication signals with a subset of the canisters received in the second plurality of slots; and
- at least one third rack, each third rack comprising a third plurality of slots, each slot in the third plurality of slots operative to receive one of the plurality of canisters, each third rack not operative to supply power and not operative to exchange communication signals with canisters received in the third plurality of slots.

9. The data storage system of claim 8 wherein at least one of the plurality of canisters is operative to recognize whether it has been received in a first rack or a second rack.

* * * * *